US 9,555,587 B2

United States Patent
Koncz

(10) Patent No.: US 9,555,587 B2
(45) Date of Patent: Jan. 31, 2017

(54) COMPOSITE LAYUP TOOLS FOR AIRCRAFT FUSELAGE BARRELS, METHODS OF ASSEMBLING THE LAYUP TOOLS, AND AIRCRAFT FUSELAGE BARREL SECTIONS FORMED UTILIZING THE LAYUP TOOLS

(71) Applicant: The Boeing Company, Huntington Beach, CA (US)

(72) Inventor: Tibor A. Koncz, Monroe, WA (US)

(73) Assignee: The Boeing Company, Chicago, IL (US)

( * ) Notice: Subject to any disclaimer, the term of this patent is extended or adjusted under 35 U.S.C. 154(b) by 197 days.

(21) Appl. No.: 14/459,203

(22) Filed: Aug. 13, 2014

(65) Prior Publication Data

US 2016/0046084 A1    Feb. 18, 2016

(51) Int. Cl.
*B29C 70/54* (2006.01)
*B29C 70/30* (2006.01)
*B64C 1/06* (2006.01)
*B29L 31/30* (2006.01)
*B64F 5/00* (2006.01)
(Continued)

(52) U.S. Cl.
CPC ............. *B29C 70/30* (2013.01); *B64C 1/069* (2013.01); *B29C 65/562* (2013.01); *B29C 66/1142* (2013.01); *B29C 66/21* (2013.01); *B29C 66/543* (2013.01); *B29C 66/636* (2013.01); *B29C 66/721* (2013.01); *B29C 66/7212* (2013.01); *B29C 66/72141* (2013.01); *B29L 2031/3082* (2013.01); *B64F 5/0009* (2013.01); *Y02T 50/433* (2013.01)

(58) Field of Classification Search
CPC ............. B29L 2031/3082; B29C 70/30; B29C 66/7212; B29C 66/721; B29C 66/636; B29C 66/72141; B29C 65/562; B29C 66/1142; B29C 66/21; B29C 66/543; Y02T 50/433; B64C 1/069; B64F 5/0009; B29K 2307/04; B29K 2309/08
See application file for complete search history.

(56) References Cited

U.S. PATENT DOCUMENTS 8,061,035 B2    11/2011 Stulc et al.
2001/0054228 A1*  12/2001 Lehmker .................. B21J 15/10
                                                                29/701
(Continued)

*Primary Examiner* — Jacob T Minskey
*Assistant Examiner* — Vishal I Patel
(74) *Attorney, Agent, or Firm* — DASCENZO Intellectual Property Law, P.C.

(57) ABSTRACT

Composite layup tools for aircraft fuselage barrels, methods of assembling the layup tools, and aircraft fuselage barrels formed utilizing the layup tools are disclosed herein. A method of assembling the layup tools includes aligning an adaptor mating surface of a splice adaptor with a mandrel mating surface of a layup mandrel and initially attaching the splice adaptor to the layup mandrel at an initial attachment point. The methods further include attaching a lower lobe of the splice adaptor to a lower lobe of the layup mandrel. A method of forming a fuselage barrel assembly includes providing two fuselage barrel sections and a splice ring, aligning the two fuselage barrel sections, locating the splice ring within the two fuselage barrel sections, and attaching both fuselage barrel sections to the splice ring. The systems include a layup tool that is formed using the methods.

18 Claims, 10 Drawing Sheets

(51) Int. Cl.
B29C 65/56 (2006.01)
B29C 65/00 (2006.01)

(56) References Cited

U.S. PATENT DOCUMENTS

| | | | |
|---|---|---|---|
| 2008/0246175 A1* | 10/2008 | Biornstad | B29C 53/587 264/109 |
| 2009/0139641 A1 | 6/2009 | Chapman et al. | |
| 2014/0327184 A1* | 11/2014 | Chang | B23Q 3/00 264/299 |

* cited by examiner

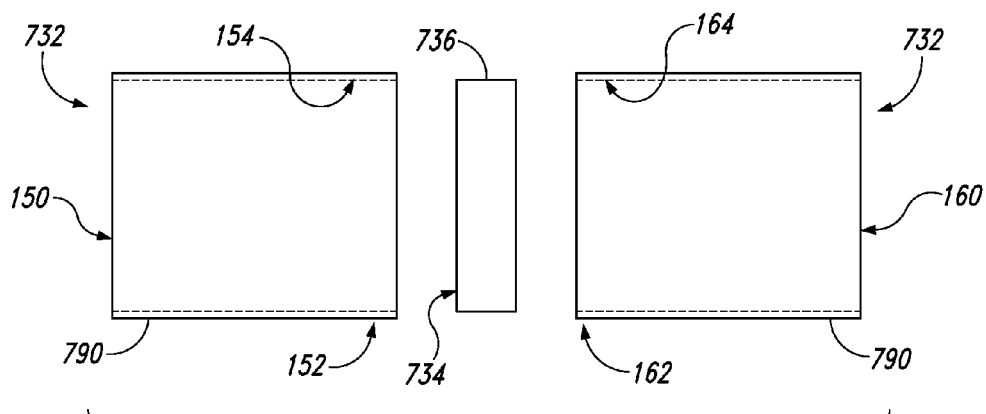
Fig. 3
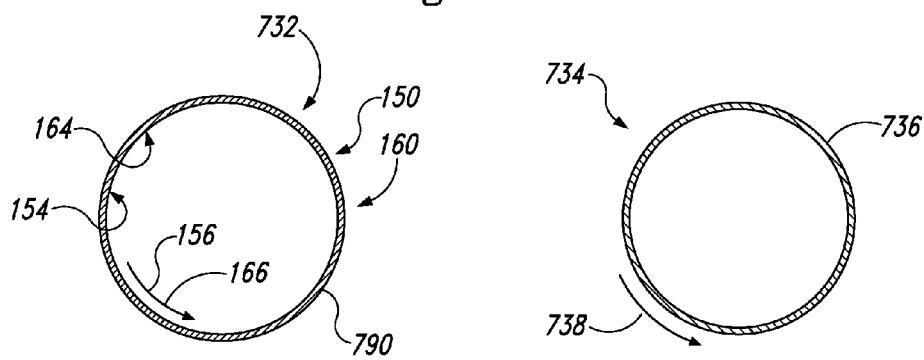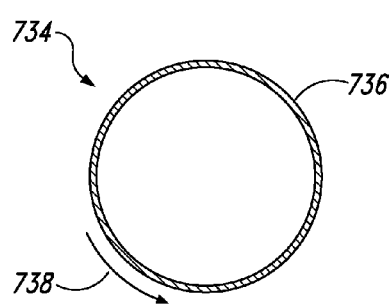
Fig. 4    Fig. 5
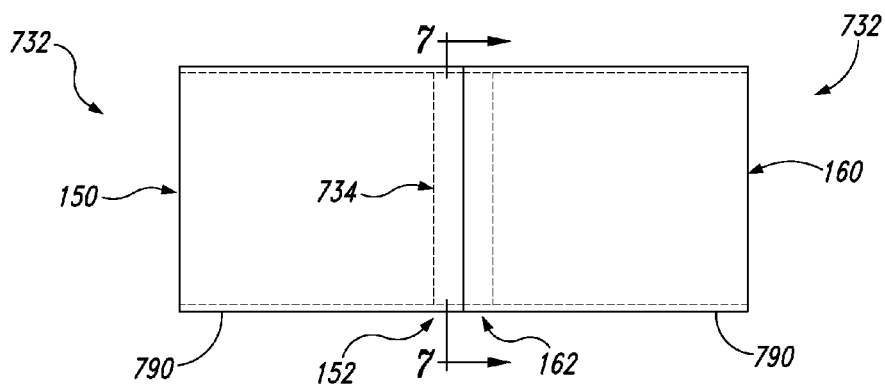
Fig. 6

COMPOSITE LAYUP TOOLS FOR AIRCRAFT FUSELAGE BARRELS, METHODS OF ASSEMBLING THE LAYUP TOOLS, AND AIRCRAFT FUSELAGE BARREL SECTIONS FORMED UTILIZING THE LAYUP TOOLS

FIELD

The present disclosure relates generally to aircraft assembly and more particularly to composite layup tools for aircraft fuselage barrels and to methods of assembling the layup tools.

BACKGROUND

Fuselage barrel assemblies for aircraft are large, complex structures that may be assembled from a plurality of fuselage barrel sections. Each of the fuselage barrel sections may have a characteristic cross-sectional dimension of several meters and an even larger length. For example, the characteristic cross-sectional dimension of fuselage barrel sections of certain larger aircraft may be nearly six meters and the length may be nearly 10 meters, or more.

In addition, current state-of-the-art aircraft generally are composite structures that may be formed from a plurality of different components, including fiber-reinforced composite materials and metals. In one specific example, a composite skin of the fuselage barrel section may be formed from a fiber-reinforced composite material. The fiber-reinforced composite material may be laid up on an inner mold line layup tool and cured to form the composite skin. Subsequently, the layup tool may be separated from the composite skin and a frame assembly may be located within an inner volume that is defined by the composite skin and attached to the composite skin to form a fuselage barrel section.

A plurality of fuselage barrel sections may be attached to one another to form the fuselage barrel assembly. This assembly process may include locating a splice ring between adjacent fuselage barrel sections and attaching the adjacent fuselage barrel sections to the splice ring. The frame assemblies of the adjacent fuselage barrel sections also may be attached to one another. Often, it may be difficult to accurately align the frame assemblies of the adjacent fuselage barrel sections, and portions of the fuselage barrel sections often must be reworked to permit a required degree of alignment between the frame assemblies. In addition, it also may be difficult to accurately match a circumferential length of the adjacent fuselage barrel sections, and shims often may be located between one, or both, of the composite skins and the splice ring. The rework and the shimming both may decrease a production rate of the fuselage barrel assembly and/or increase a cost of the fuselage barrel assembly. Thus, there exists a need for improved composite layup tools for aircraft fuselage barrels and for improved methods of assembling the layup tools.

SUMMARY

Composite layup tools for aircraft fuselage barrels, methods of assembling the layup tools, and aircraft fuselage barrels formed utilizing the layup tools are disclosed herein. A method of assembling the layup tools includes aligning an adaptor mating surface of a splice adaptor with a mandrel mating surface of a layup mandrel and initially attaching the splice adaptor to the layup mandrel at an initial attachment point. The methods further include attaching a lower lobe of the splice adaptor to a lower lobe of the layup mandrel. The systems include a layup tool that is formed using the methods of assembling the layup tool.

The aligning may include rotationally aligning a bottom center line (BCL) reference direction of the splice adaptor and a BCL reference direction of the splice ring with a BCL reference direction of the layup tool. The aligning also may include radially aligning an outer surface of the splice adaptor with an outer surface of the layup tool along and/or proximate the BCL reference direction of the layup tool.

The attaching the lower lobe of the splice adaptor to the lower lobe of the layup mandrel may include radially aligning the outer surface of the splice adaptor with the outer surface of the layup mandrel proximal each of a plurality of lower lobe attachment points. The attaching the lower lobe further may include attaching the splice adaptor to the layup mandrel at each of the plurality of lower lobe attachment points to retain radial alignment between the outer surface of the splice adaptor and the outer surface of the layup tool.

A method of forming a fuselage barrel assembly includes providing two fuselage barrel sections and a splice ring. The method further includes aligning the two fuselage barrel sections, locating the splice ring within the two fuselage barrel sections, and attaching both fuselage barrel sections to the splice ring.

The providing the first fuselage barrel section may include providing a first fuselage barrel section that includes a first joint portion. The first joint portion includes a first interior joint surface that has a first inner circumferential length. The providing the second fuselage barrel section may include providing a second fuselage barrel section that includes a second joint portion. The second joint portion may have a second interior joint surface that has a second inner circumferential length. The providing the splice ring may include providing a splice ring that has a splice ring outer surface that has a splice ring outer circumferential length.

The aligning may include operatively aligning the first fuselage barrel section and the second fuselage barrel section such that the first joint portion faces toward the second joint portion. The locating may include locating the splice ring within both the first joint portion and the second joint portion.

The attaching may include operatively attaching the first fuselage barrel section and the second fuselage barrel section to the splice ring. The operatively attaching may include initially attaching at a pair of initial attachment points that are located along and/or proximate a BCL reference direction of the fuselage barrel assembly. Subsequently, the operatively attaching also may include attaching at a plurality of pairs of subsequent attachment points in a symmetrical fashion about the initial attachment point.

BRIEF DESCRIPTION OF THE DRAWINGS

FIG. 3 is a schematic side view of two fuselage barrel sections and a splice ring prior to assembly.

FIG. 4 is a schematic end view of the fuselage barrel sections of FIG. 3.

FIG. 5 is a schematic end view of the splice ring of FIG. 3.

FIG. 6 is a schematic side view of the fuselage barrel sections and splice ring of FIGS. 3-5 with the fuselage barrel sections aligned and the splice ring inserted into joint portions of the fuselage barrel sections.

DESCRIPTION

Figure 1:
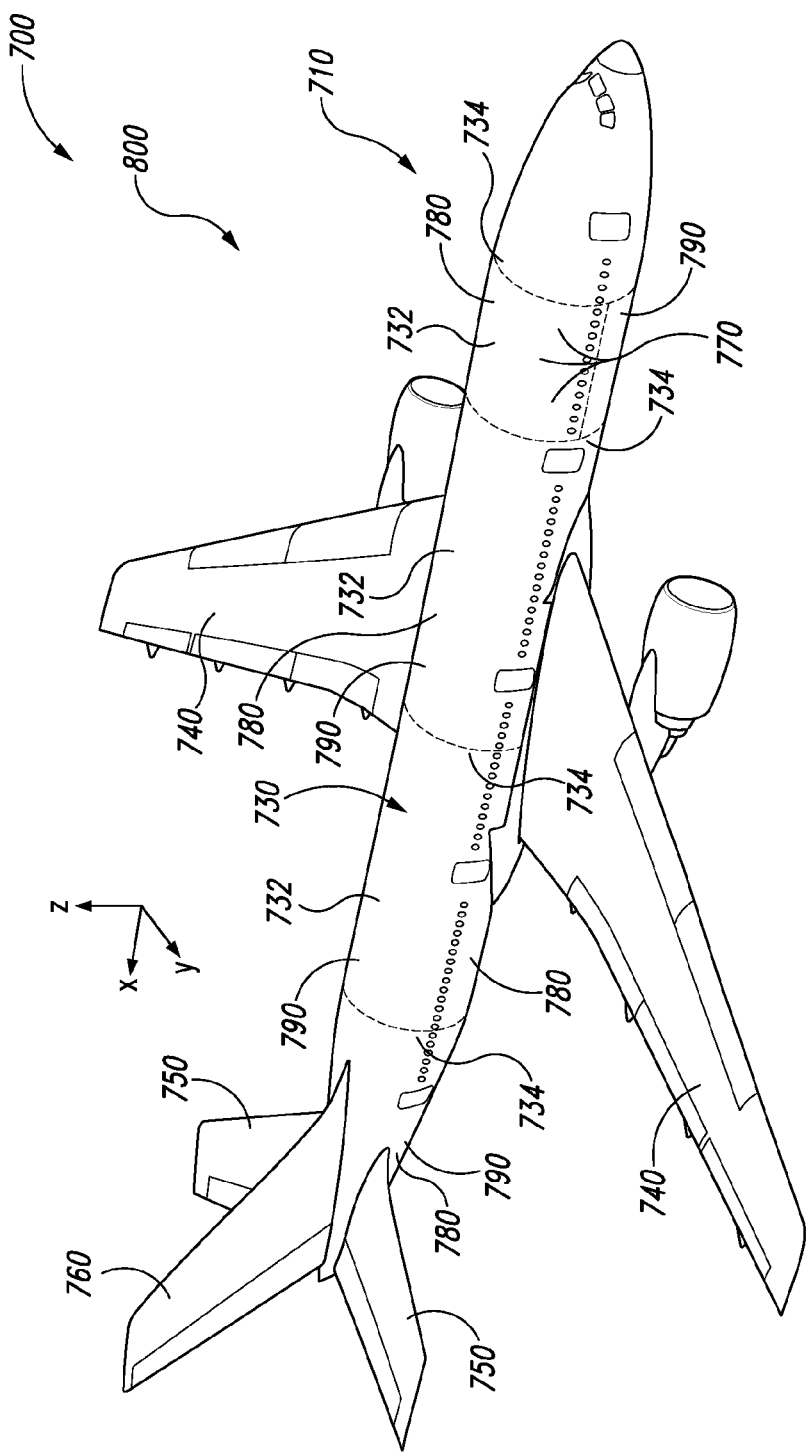
FIG. 1 is a schematic representation of an example of an aircraft that includes a fuselage barrel assembly that may be assembled utilizing the systems and methods according to the present disclosure.

FIGS. 1-21 provide examples of fuselage barrel assemblies 730 that may be formed utilizing the systems and methods according to the present disclosure, of layup tools 340 according to the present disclosure, of components of layup tools 340, and/or of assembly processes and/or methods, according to the present disclosure, for assembling layup tools 340, components of layup tools 340, fuselage barrel assemblies 730, and/or components of fuselage barrel assemblies 730. Elements that serve a similar, or at least substantially similar, purpose are labeled with like numbers in each of FIGS. 1-21, and these elements may not be discussed in detail herein with reference to each of FIGS. 1-21. Similarly, all elements may not be labeled in each of FIGS. 1-21, but reference numerals associated therewith may be utilized herein for consistency. Elements, components, and/or features that are discussed herein with reference to one or more of FIGS. 1-21 may be included in and/or utilized with any of FIGS. 1-21 without departing from the scope of the present disclosure.

In general, elements that are likely to be included in a given (i.e., a particular) embodiment are illustrated in solid lines, while elements that are optional to a given embodiment are illustrated in dashed lines. However, elements that are shown in solid lines are not essential to all embodiments, and one or more elements shown in solid lines may be omitted from a given embodiment without departing from the scope of the present disclosure.

FIG. 1 is a schematic representation of an example of an aircraft 700 that includes a fuselage barrel assembly 730 that may be assembled utilizing the systems and methods according to the present disclosure. Fuselage barrel assembly 730 includes a plurality of fuselage barrel sections 732 that may be operatively attached to one another, such as via a plurality of respective splice rings 734, to form fuselage barrel assembly 730.

Fuselage barrel assembly 730 may form a portion of an aircraft 700 that may include, be, or be formed from, a structurally reinforced composite structure 800. As discussed in more detail herein, fuselage barrel sections 732 each may include a respective frame assembly 780 and a respective composite skin 790 that covers the respective frame assembly and is operatively attached to the frame assembly. As illustrated in FIG. 1, aircraft 700 further may include an airframe 710, a wing 740, a horizontal stabilizer 750, and/or a vertical stabilizer 760.

Composite skins 790 may cover and/or be an outer surface of any suitable portion of aircraft 700. Aircraft 700 also may include a plurality of stringers 770 that, together with frame assemblies 780, may support an inner surface composite skin 790. Fuselage barrel assembly 730 may define, or have, a longitudinal axis (such as the X-axis in FIG. 1) and two transverse axes (such as the Y and Z-axes in FIG. 1).

Composite skin 790 may be formed from and/or include any suitable material and/or materials of construction. This may include flexible materials and/or materials. As an example, composite skin 790 may include a composite fiber and a resin material. As a more specific example, composite skin 790 may be formed from a plurality of layers of a pre-impregnated composite material that includes the composite fiber and the resin material. Examples of the composite fiber include a fiberglass fiber, a fiberglass cloth, a carbon fiber, and/or a carbon cloth. Examples of the resin material include an epoxy, an adhesive, and/or a polymeric resin.

As discussed in more detail herein, a variety of tools may be utilized to form, fabricate, and/or construct aircraft 700 and/or components thereof. For example, layup tools may be utilized to form, fabricate, and/or construct composite skins 790, with these layup tools controlling and/or regulating a shape, a conformation, and/or dimensions of composite skins 790. The shape, conformation, and/or dimensions of composite skin 790 may have a direct impact on an ease of assembly, cost of assembly, and/or process utilized during assembly of fuselage barrel sections 732 to form fuselage barrel assembly 730, and the systems and methods disclosed herein may permit improved, cheaper, and/or more streamlined assembly processes to be utilized.

For example, adjacent fuselage barrel sections that may be formed utilizing conventional systems and/or methods may exhibit significant variation in a circumferential length of respective joint portions of the adjacent fuselage barrel sections. This variation in circumferential length may generate annular gaps between splice rings 734 and composite skins 790, and these annular gaps often must be filled, or spanned, with a plurality of shims. This shimming process may be expensive, time-consuming, inexact, and/or prone to rework and increases a complexity of the overall manufacturing process. However, the systems and methods disclosed herein may be configured to significantly decrease, or even eliminate, the variation in circumferential length, thereby decreasing, or even eliminating, the annular gaps and/or the need for the shimming process.

As another example, it often may be difficult to accurately align adjacent frame assemblies 780 of adjacent fuselage barrel sections 732 when assembling fuselage barrel assembly 730 utilizing conventional systems and/or methods. This difficulty in aligning the adjacent frame assemblies may be caused by a variety of factors, including a size of fuselage barrel sections 732, an inherent flexibility of fuselage barrel sections 732 and/or components thereof, and/or a difficulty in providing exact reference points, or relative orientations, for attachment of individual frame assemblies 780 to corresponding composite skins 790 during assembly of individual fuselage barrel sections 732. The systems and methods disclosed herein may be configured to significantly improve alignment of the adjacent frame assemblies.

Figure 2:
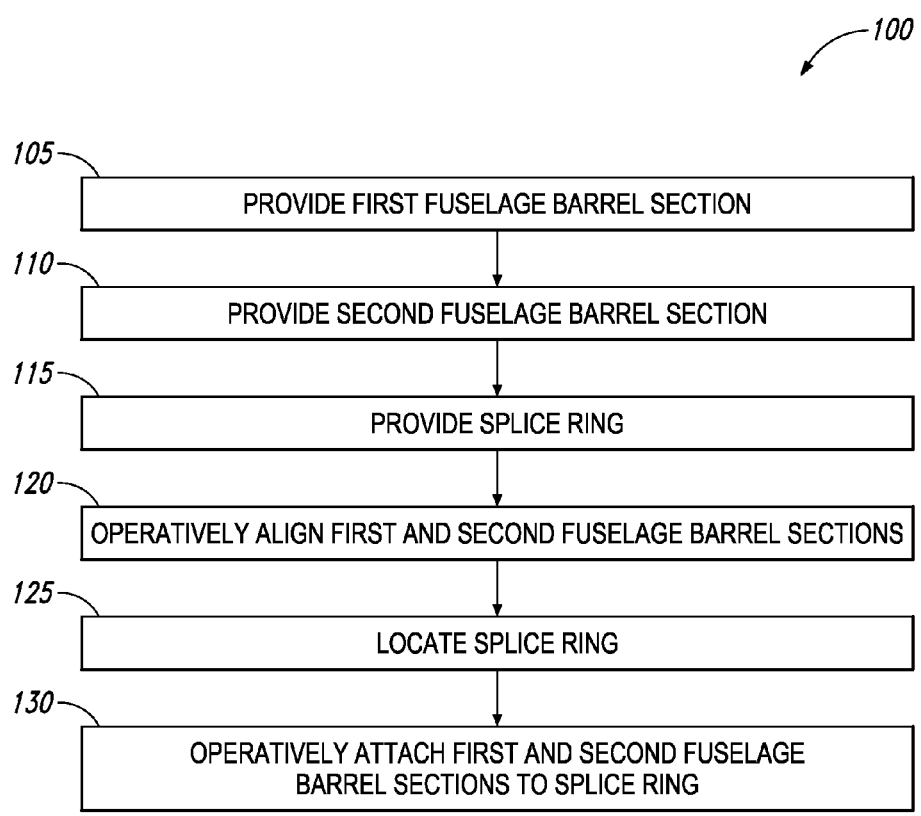
FIG. 2 is a flowchart depicting methods, according to the present disclosure, of forming a fuselage barrel assembly.
Figure 7:
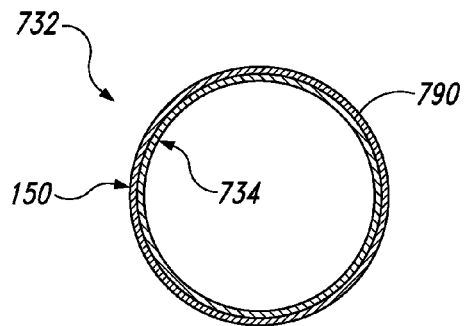
FIG. 7 is a schematic cross-sectional view taken along line 7-7 of FIG. 6.
Figure 8:
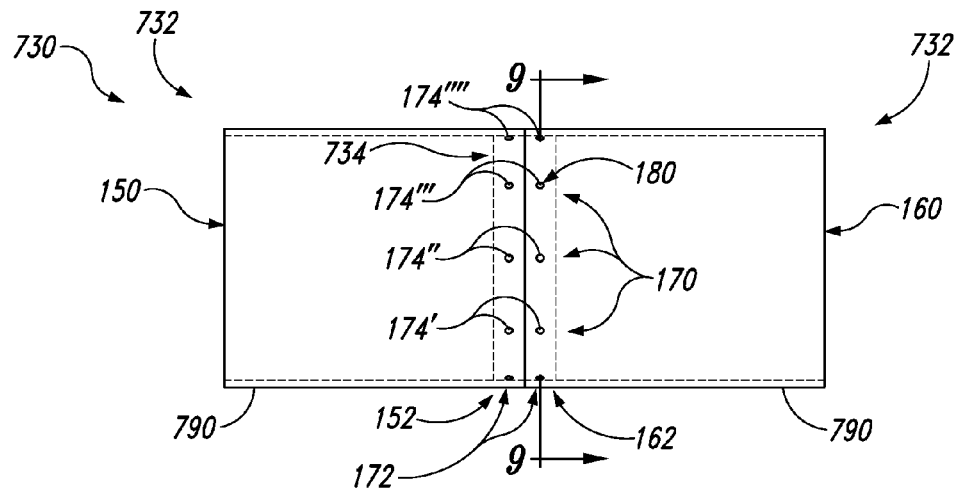
FIG. 8 is a schematic side view of the fuselage barrel sections and the splice ring of FIGS. 3-7 with the two fuselage barrel sections operatively attached to the splice ring.
Figure 9:
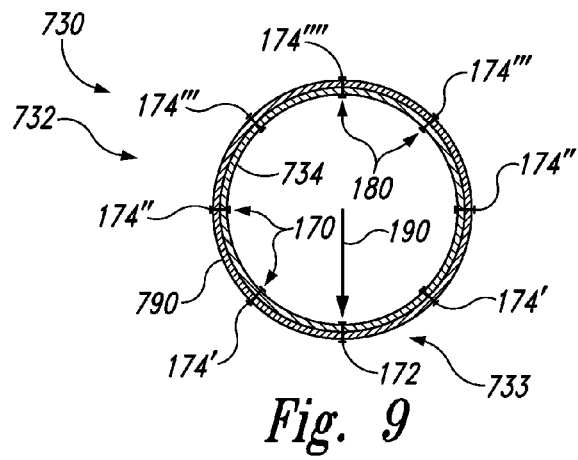
FIG. 9 is a schematic cross-sectional view taken along line 9-9 of FIG. 8.

FIG. 2 is a flowchart depicting methods 100, according to the present disclosure, of forming a fuselage barrel assembly of an aircraft (such as fuselage barrel assembly 730 of FIG. 1), while FIGS. 3-9 are schematic illustrations of a process flow that may be utilized to form a fuselage barrel assembly 730 and/or that may be performed utilizing the method of FIG. 2. More specifically, FIG. 3 is a schematic side view of two fuselage barrel sections 732 and a splice ring 734 prior to assembly. FIG. 4 is a schematic end view of fuselage barrel sections 732. FIG. 5 is a schematic end view of splice ring 734. FIG. 6 is a schematic side view of fuselage barrel sections 732 and splice ring 734 of FIGS. 3-5 with the fuselage barrel sections aligned and the splice ring inserted into joint portions 152 and 162 of the fuselage barrel sections. FIG. 7 is a schematic cross-sectional view of fuselage barrel section 732 and splice ring 734 taken along line 7-7 of FIG. 6. FIG. 8 is a schematic side view of the fuselage barrel sections 732 and splice ring 734 of FIGS. 3-7 with the two fuselage barrel sections operatively attached to the splice ring. FIG. 9 is a schematic cross-sectional view of fuselage barrel section 732 and splice ring 734 taken along line 9-9 of FIG. 8.

Returning to FIG. 2, methods 100 may include providing a first fuselage barrel section at 105, providing a second fuselage barrel section at 110, and/or providing a splice ring at 115. Methods 100 further may include operatively aligning the first and second fuselage barrel sections at 120, locating the splice ring at 125, and/or operatively attaching the first and second fuselage barrel sections to the splice ring at 130.

Providing the first fuselage barrel section at 105 may include providing any suitable first fuselage barrel section in any suitable manner. For example, the providing at 105 may include providing a first fuselage barrel section 150, as illustrated in FIGS. 3-4 and 6-8. As another example, the providing at 105 may include performing methods 200, which are discussed in more detail herein. The first fuselage barrel section may include a first joint portion, as illustrated in FIGS. 3, 6, and 8 at 152. The first joint portion may have a first interior joint surface, as illustrated in FIGS. 3-4 at 154, which may be formed by a composite skin 790 of the first fuselage barrel section. The first interior joint surface may have, or define, a first inner circumferential length, as illustrated in FIG. 4 at 156.

Providing the second fuselage barrel section at 110 may include providing any suitable second fuselage barrel section in any suitable manner. For example, the providing at 110 may include providing a second fuselage barrel section 160, as illustrated in FIGS. 3-4, 6, and 8. As another example, the providing at 110 may include performing methods 200, which are discussed in more detail herein. The second fuselage barrel section may include a second joint portion, as illustrated in FIGS. 3, 6, and 8 at 162. The second joint portion may have a second interior joint surface, as illustrated in FIGS. 3-4 at 164, which may be formed by a composite skin 790 of the second fuselage barrel section. The second interior joint surface may have, or define, a second inner circumferential length, as illustrated in FIG. 4 at 166.

Providing the splice ring at 115 may include providing any suitable splice ring in any suitable manner. For example, the providing at 115 may include providing splice ring 734 of FIGS. 3 and 5-9. The splice ring may have an outer surface, as indicated in FIGS. 3 and 5 at 736. The splice ring outer surface may include, define, or have a splice ring outer circumferential length, as illustrated in FIG. 5 at 738.

As discussed in more detail herein, the systems and methods according to the present disclosure may include forming fuselage barrel sections 150 and 160 and/or splice ring 734 such that first inner circumferential length 156, second inner circumferential length 166, and/or splice ring outer circumferential length 738 differ by less than a threshold circumferential length difference. As examples, the threshold circumferential length difference may be less than 4 millimeters (mm), less than 3.5 mm, less than 3 mm, less than 2.5 mm, less than 2 mm, less than 1.5 mm, less than 1 mm, less than 0.5 mm, less than 0.25 mm, or less than 0.1 mm.

Additionally or alternatively, the systems and methods according to the present disclosure also may include forming fuselage barrel sections 150 and 160 and/or splice ring 734 such that first inner circumferential length 156, second inner circumferential length 166, and/or splice ring outer circumferential length 738 are within a threshold circumferential length range. As examples, the threshold circumferential length range may be at least 15 meters (m), at least 15.5 m, at least 16 m, at least 16.5 m, at least 17 m, at least 17.5 m, or at least 18 m. Additionally or alternatively, the threshold circumferential length range also may be less than 21 m, less than 20.5 m, less than 20 m, less than 19.5 m, less than 19 m, less than 18.5 m, or less than 18 m.

Operatively aligning the first and second fuselage barrel sections at 120 may include operatively aligning such that the first joint portion faces toward the second joint portion. For example, and as illustrated in FIG. 3, the operatively aligning at 120 may include operatively aligning such that first joint portion 152 of first fuselage barrel section 150 faces toward and/or is (at least substantially) radially and/or axially aligned with second joint portion 162 of second fuselage barrel section 160.

Locating the splice ring at 125 may include locating the splice ring within both the first joint portion and the second joint portion and may include translating the first fuselage barrel section and the second fuselage barrel section toward one another. For example, and as illustrated in FIG. 6, fuselage barrel sections 150 and 160 may be aligned and splice ring 734 may be inserted into both first joint portion 152 and second joint portion 162.

Operatively attaching the first and second fuselage barrel sections to the splice ring at 130 may include operatively attaching both the first fuselage barrel section and the second fuselage barrel section to the splice ring in any suitable manner. As illustrated in FIG. 7 and discussed in more detail herein, the systems and methods according to the present disclosure may include forming fuselage barrel sections 150 and 160 such that there is very little, or even (at least substantially) no, annular gap between fuselage barrel sections 732 and splice ring 734 and/or such that first inner circumferential length 156 of first fuselage barrel section 150 is (at least substantially) equal to second inner circumferential length 166 of second fuselage barrel section 160, as discussed herein with reference to FIGS. 4-5. Thus the operatively attaching at 130 may include operatively attaching such that no shim extends between first fuselage barrel section 150 and splice ring 734 and/or such that no shim extends between second fuselage barrel section 160 and splice ring 734.

This may be facilitated by first inner circumferential length 156 being (at least substantially) equal to second inner circumferential length 166. For example, splice ring outer circumferential length 738, which is illustrated in FIG. 5, may be (at least substantially) equal to, or within the threshold circumferential length difference of, first inner circumferential length 156 and second inner circumferential length 166, which are illustrated in FIG. 4. As another example, splice ring 734 may be a split splice ring 734 and/or a multi-piece splice ring 734 that is configured to expand and/or contract such that splice ring outer circumferential length 738 is (at least substantially) equal to, or within the threshold length difference of, first inner circumferential length 156 and second inner circumferential length 166.

As illustrated in FIGS. 8-9, the operatively attaching at 130 may include operatively attaching at a plurality of attachment points 170. This may include extending a fastener 180 through splice ring 734 and either first fuselage barrel section 150 or second fuselage barrel section 160 at each attachment point 170.

The operatively attaching at 130 may include operatively attaching in a given, predetermined, and/or specified attachment sequence. For example, the operatively attaching at 130 may include operatively attaching at a pair of initial attachment points 172 and subsequently progressing (at least substantially) symmetrically about the pair of initial attachment points and circumferentially around fuselage barrel assembly 730 from initial attachment points 172. The pair of initial attachment points may be located along, or proximal, a bottom center line (BCL) reference direction 190 of fuselage barrel assembly 730. One attachment point in each pair of attachment points 172 may operatively attach first fuselage barrel section 150 to splice ring 734, while the other attachment point in each pair of attachment points 172 may operatively attach second fuselage barrel section 160 to splice ring 734.

As a more specific example, and with continued reference to FIGS. 8-9, the operatively attaching at 130 may include initially attaching at initial attachment points 172 that are located along, or proximal, BCL reference direction 190 of fuselage barrel assembly 730. Subsequently, the operatively attaching at 130 may include operatively attaching at a plurality of pairs of subsequent attachment points 174. This may include operatively attaching at a given pair of subsequent attachment points 174 on a given side of initial attachment points 172 and at a corresponding pair of subsequent attachment points 174 on an opposed side of initial attachment points 172 prior to attaching at another pair of subsequent attachment points 174 that is farther from initial attachment points 172 than the given pair of subsequent attachment points 174.

For example, the operatively attaching at 130 may include operatively attaching at subsequent attachment points 174' prior to operatively attaching at subsequent attachment points 174". Similarly, the operatively attaching at 130 may include operatively attaching at subsequent attachment points 174" prior to operatively attaching at subsequent attachment points 174'". In addition, the operatively attaching at 130 may include operatively attaching at subsequent attachment points 174'" prior to operatively attaching at subsequent attachment points 174"". Such an attachment procedure may direct any mismatch among first fuselage barrel section 150, second fuselage barrel section 160, and splice ring 734 away from BCL reference direction 190. This may improve alignment of portions of frame assemblies that may be proximal a BCL of fuselage barrel assembly 730 and/or that are within a lower lobe of fuselage barrel assembly 730, as discussed in more detail herein.

Figure 13:
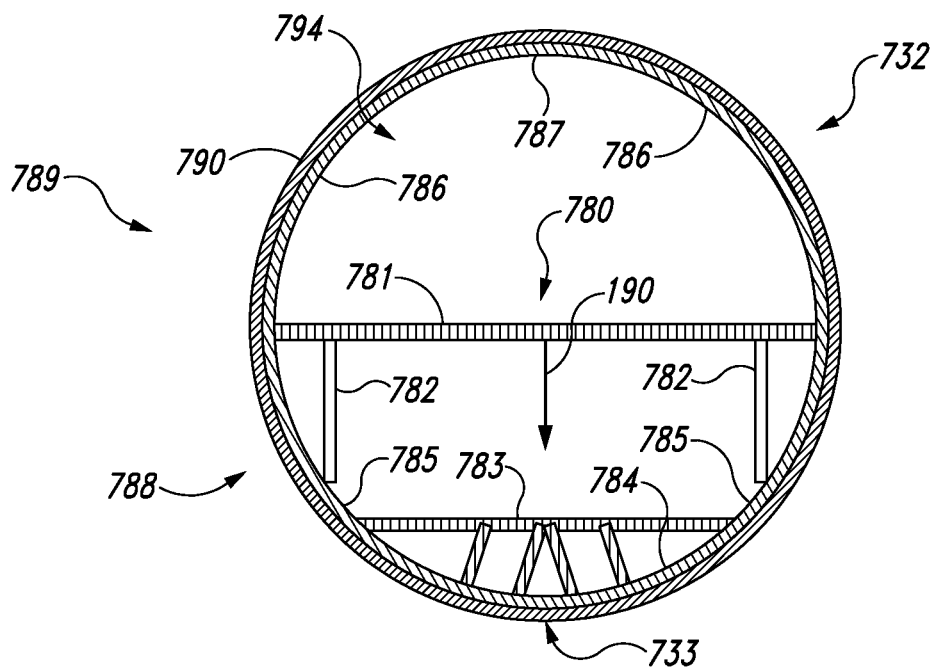
FIG. 13 is a schematic front view of a fuselage barrel section that includes the composite skin of FIGS. 11-12 and a frame assembly.

BCL reference direction 190 may be selected and/or determined in any suitable manner. For example, BCL reference direction 190 may be defined, or specified, by a vector that is perpendicular to passenger floor grid 781 and that passes through a midline of the passenger floor grid, as illustrated in FIG. 13. As another example, BCL reference direction 190 may point generally from a centroid of fuselage barrel assembly 730 and toward a BCL location 733 of fuselage barrel assembly 730, as illustrated in FIG. 9. As yet another example, BCL reference direction 190 may be a vector, or direction, that points from a central region of fuselage barrel assembly 730 and toward an outer surface of the fuselage barrel assembly, with the orientation of BCL reference direction 190 being selected such that the BCL reference direction points toward a critical alignment region of fuselage barrel assembly 730. As another example, the BCL reference direction may be selected such that a line, or plane, that extends along and/or proximate the BCL reference direction longitudinally bisects fuselage barrel assembly 730 and/or a lower lobe 788 thereof, as illustrated in FIG. 13.

Figure 10:
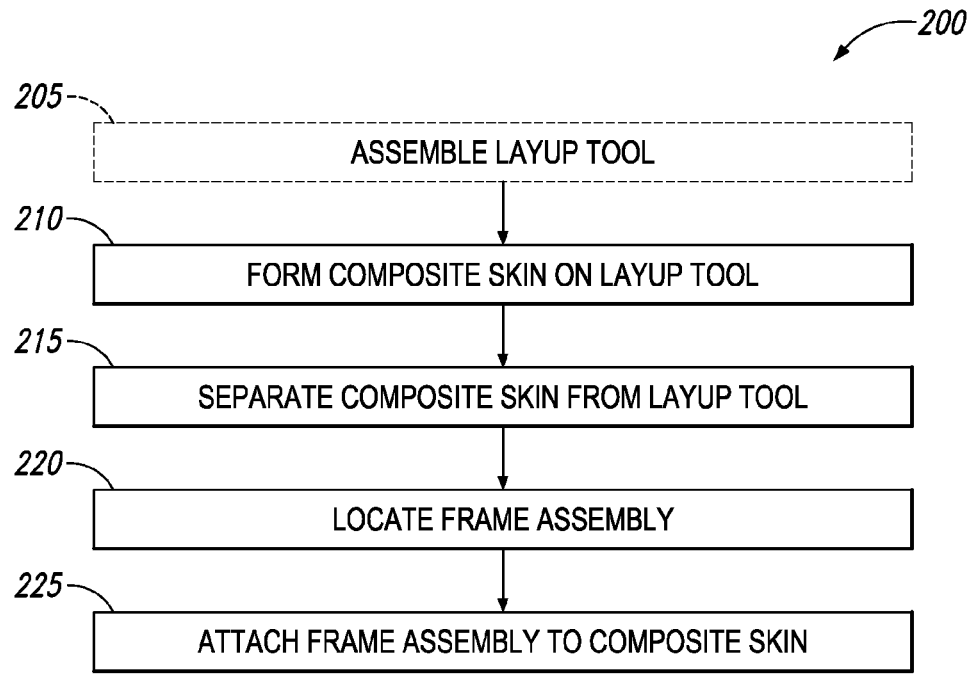
FIG. 10 is a flowchart depicting methods, according to the present disclosure, of assembling a fuselage barrel section of an aircraft.
Figure 11:
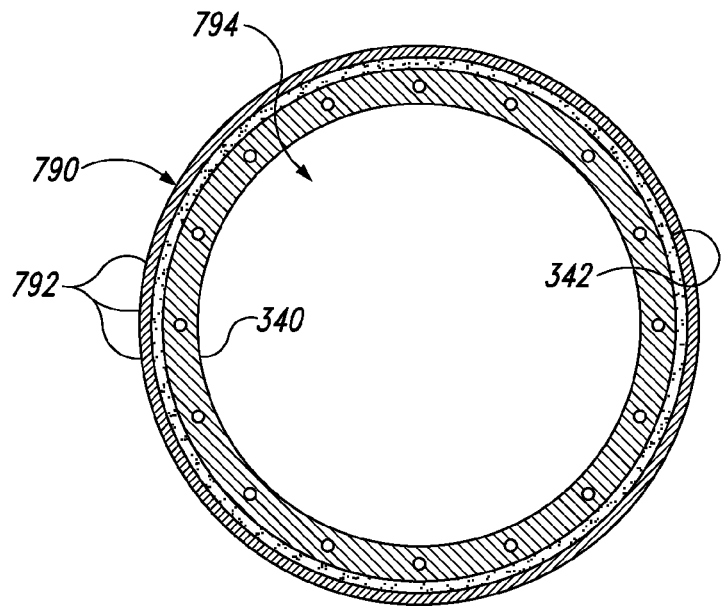
FIG. 11 is a schematic front view of a layup tool, according to the present disclosure, with a composite skin formed thereon.
Figure 12:
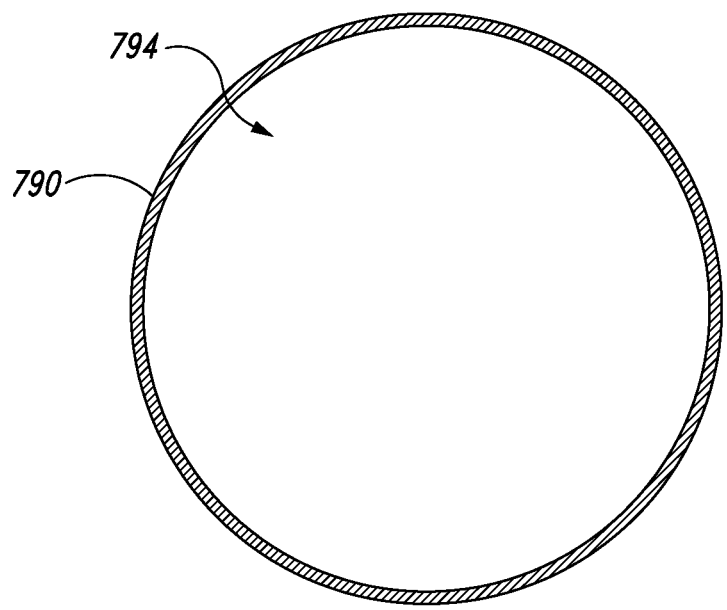
FIG. 12 is a schematic front view of the composite skin of FIG. 11 after removal from the layup tool.

FIG. 10 is a flowchart depicting methods 200, according to the present disclosure, of assembling a fuselage barrel section of an aircraft, while FIGS. 11-13 are schematic end-view illustrations of a process flow that may be utilized to form a fuselage barrel section 732 and/or that may be performed utilizing method 200 of FIG. 10. More specifically, FIG. 11 is a schematic front view of a layup tool 340, according to the present disclosure, with a composite skin 790 formed thereon. FIG. 12 is a schematic front view of composite skin 790 of FIG. 11 after removal from layup tool 340. FIG. 13 is a schematic front view of a fuselage barrel section 732 that includes composite skin 790 of FIGS. 11-12 and a frame assembly 780.

Returning to FIG. 10, methods 200 may include assembling a layup tool at 205 and include forming a composite skin on the layup tool at 210 and separating the composite skin from the layup tool at 215. Methods 200 further include locating a frame assembly at 220 and attaching the frame assembly to the composite skin at 225.

Assembling the layup tool at 205 may include assembling, forming, and/or fabricating the layup tool in any suitable manner. For example, the assembling at 205 may include assembling the layup tool utilizing methods 300, which are discussed in more detail herein.

Forming the composite skin on a layup tool at 210 may include forming any suitable composite skin on any suitable layup tool. For example, the forming at 210 may include forming composite skin 790 on layup tool 340, as illustrated in FIG. 11. As another example, the forming at 210 may include locating a plurality of plies of composite material 792 on an outer surface 342 of layup tool 340. As yet another example, the forming at 210 may include curing the plurality of plies of composite material 792 to define, or form, composite skin 790.

Separating the composite skin from the layup tool at 215 may include separating in any suitable manner. For example, the separating at 215 may include removing the layup tool from an inner volume that is at least partially defined, or formed, by the composite skin. As a more specific example, the separating at 215 may include removing layup tool 340 from an inner volume 794 that is defined, or formed, by composite skin 790 of FIG. 11 such that composite skin 790 is spaced apart from layup tool 340 and/or such that inner volume 794 no longer contains layup tool 340, as illustrated in FIG. 12.

Locating the frame assembly at 220 may include locating any suitable frame assembly within the inner volume that is defined, or formed, by the composite skin. For example, and with reference to FIG. 13, the locating at 220 may include locating frame assembly 780 within inner volume 794 of composite skin 790. The frame assembly may include any suitable structure and/or structures. For example, and with continued reference to FIG. 13, frame assembly 780 may include a passenger floor grid 781, stanchions 782, a cargo floor grid 783, a keel frame 784, lower side frames 785, upper side frames 786, and/or a crown frame 787 that may be operatively attached to one another in any suitable manner.

Lower lobe 788 of fuselage barrel section 732 may include a portion of fuselage barrel section 732 that includes, is below, and/or is located in BCL reference direction 190 from, passenger floor grid 781. Thus, lower lobe 788 may include passenger floor grid 781, stanchions 782, cargo floor grid 783, keel frame 784, and/or lower side frames 785. Similarly, an upper lobe 789 of fuselage barrel section 732 may include a portion of fuselage barrel section 732 that is above, or is located in an opposite direction from BCL reference direction 190 from, passenger floor grid 781. Thus, upper lobe 789 may include upper side frames 786 and/or crown frame 787.

During assembly of adjacent fuselage barrel sections 732 to form a fuselage barrel assembly 730, which is discussed in more detail herein with reference to FIGS. 2-9, alignment of components of the adjacent fuselage barrel sections 732 that are within corresponding lower lobes 788 may be substantially more difficult than alignment of components of the adjacent fuselage barrel sections 732 that are within corresponding upper lobes 789. This increased difficulty in alignment may be caused by a variety of factors, including an increased number of components within lower lobe 788 when compared to upper lobe 789, an increased complexity of lower lobe 788 when compared to upper lobe 789, and/or an increased rigidity of lower lobe 788 when compared to upper lobe 789.

Thus, and as discussed herein with reference to methods 100 of FIG. 2, the systems and methods according to the present disclosure may be configured to initially, or even preferentially, align portions of adjacent fuselage barrel sections 732 that are within corresponding lower lobes 788. This may include initial, or even preferential, alignment of corresponding BCL locations 733 of the adjacent fuselage barrel sections 732, initial, or even preferential, alignment of adjacent cargo floor grids 783 of adjacent fuselage barrel sections 732, and/or initial, or even preferential, alignment of adjacent passenger floor grids 781 of adjacent fuselage barrel sections 732.

Attaching the frame assembly to the composite skin at 225 may include operatively attaching the frame assembly to the composite skin in any suitable manner. As an example, the attaching at 225 may include extending a plurality of fasteners through both the composite skin and the frame assembly to operatively attach the frame assembly to the composite skin.

As discussed in more detail herein with reference to FIGS. 10-13, it may be beneficial to form and/or assemble adjacent fuselage barrel sections 732 such that corresponding lower lobes 788 of the adjacent fuselage barrel sections are initially, or preferentially, aligned with one another during assembly of fuselage barrel assemblies 730 that include the adjacent fuselage barrel sections 732. With this in mind, the systems, process flows, and methods of FIGS. 14-18 may be designed to facilitate this alignment.

Figure 14:
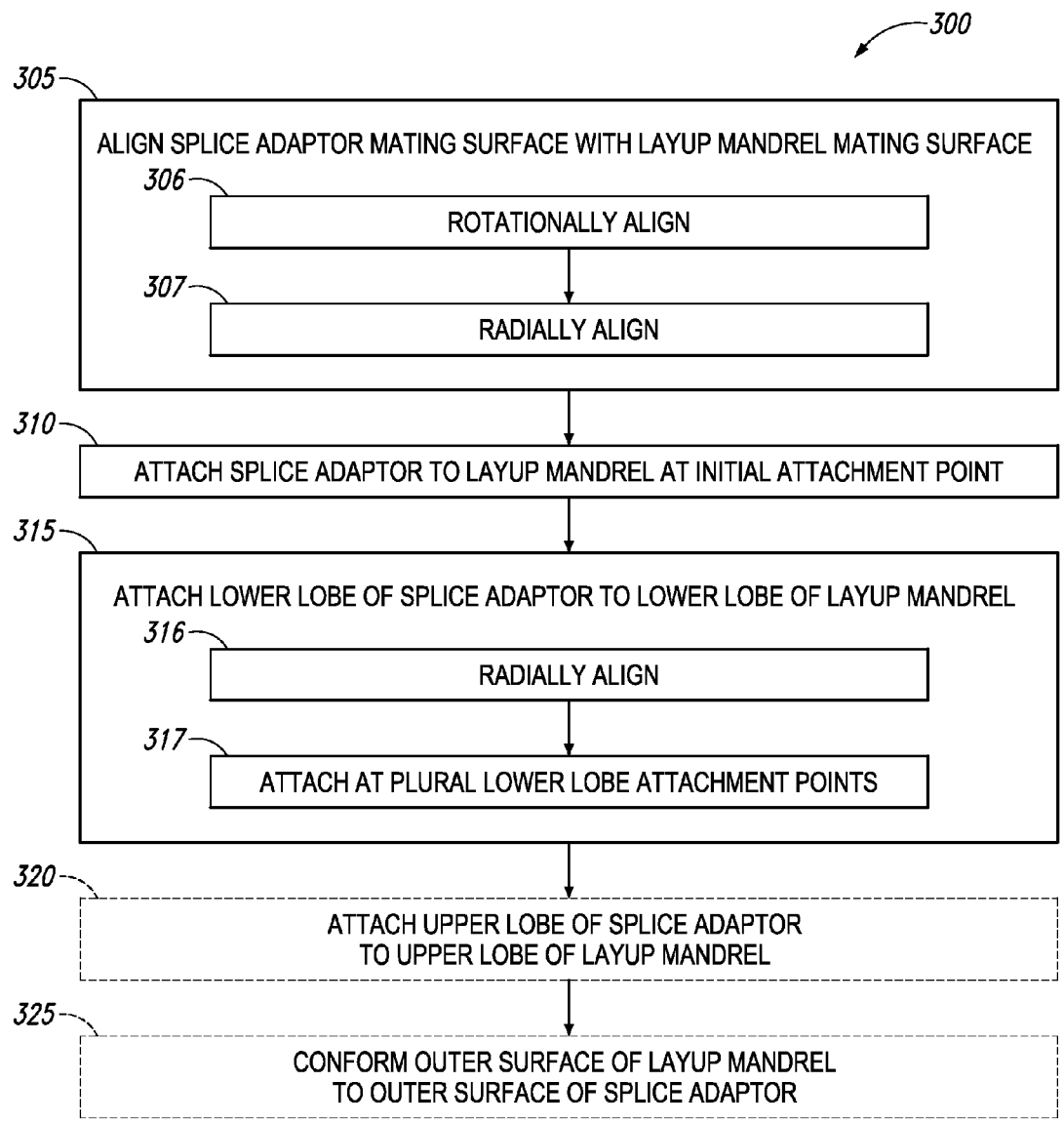
FIG. 14 is a flowchart depicting methods of assembling a layup tool according to the present disclosure.
Figure 15:
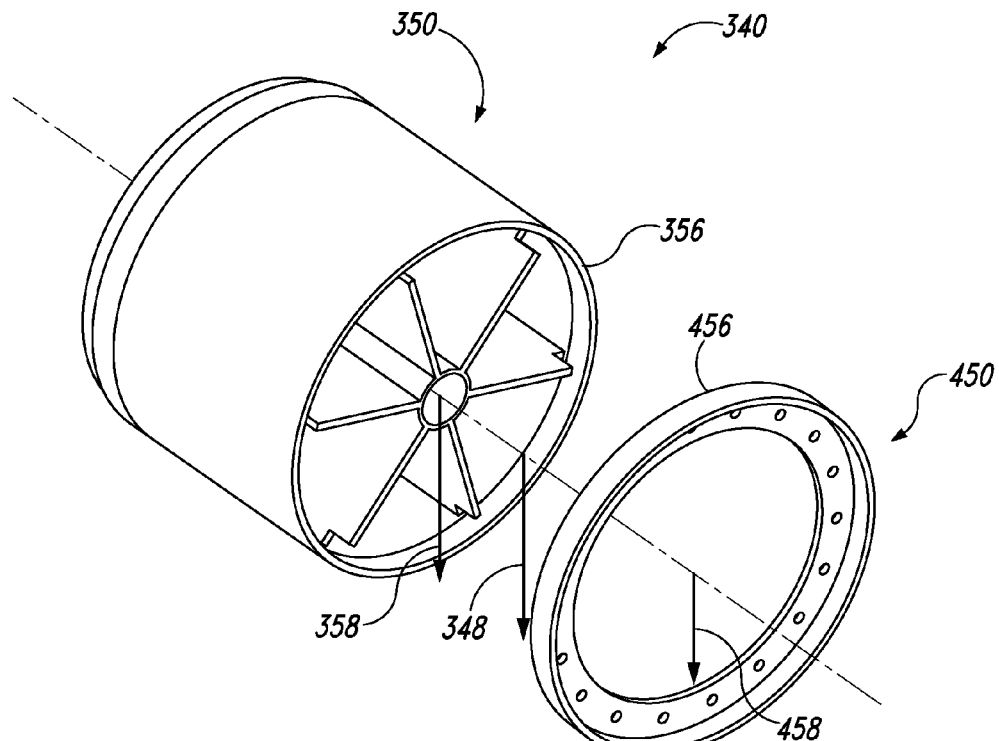
FIG. 15 is a schematic representation of an inner mold line layup mandrel and a splice adaptor that may be combined to form a layup tool according to the present disclosure.
Figure 16:
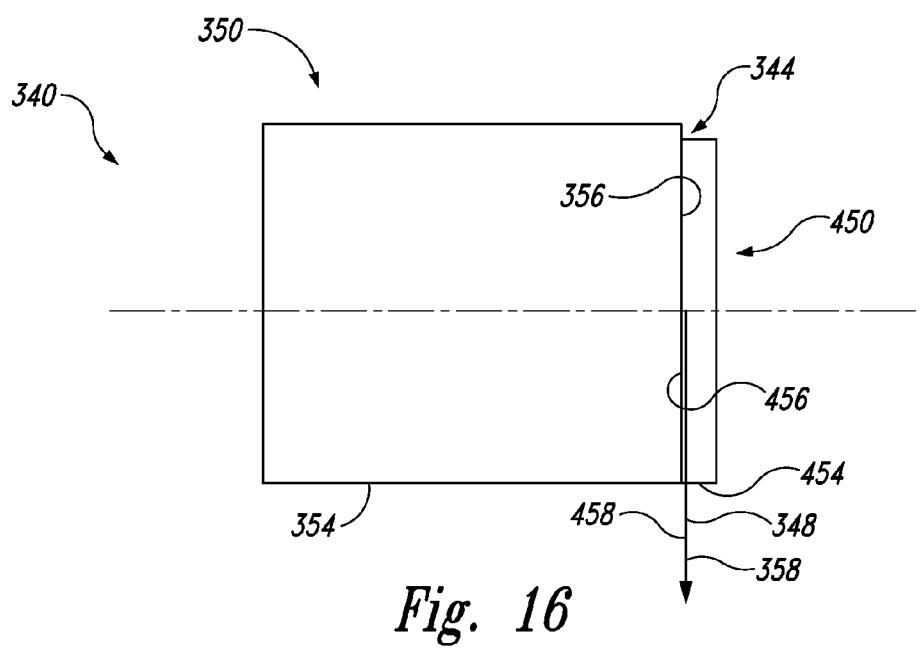
FIG. 16 is a schematic side view illustrating alignment of the layup mandrel and the splice adaptor of FIG. 15.
Figure 17:
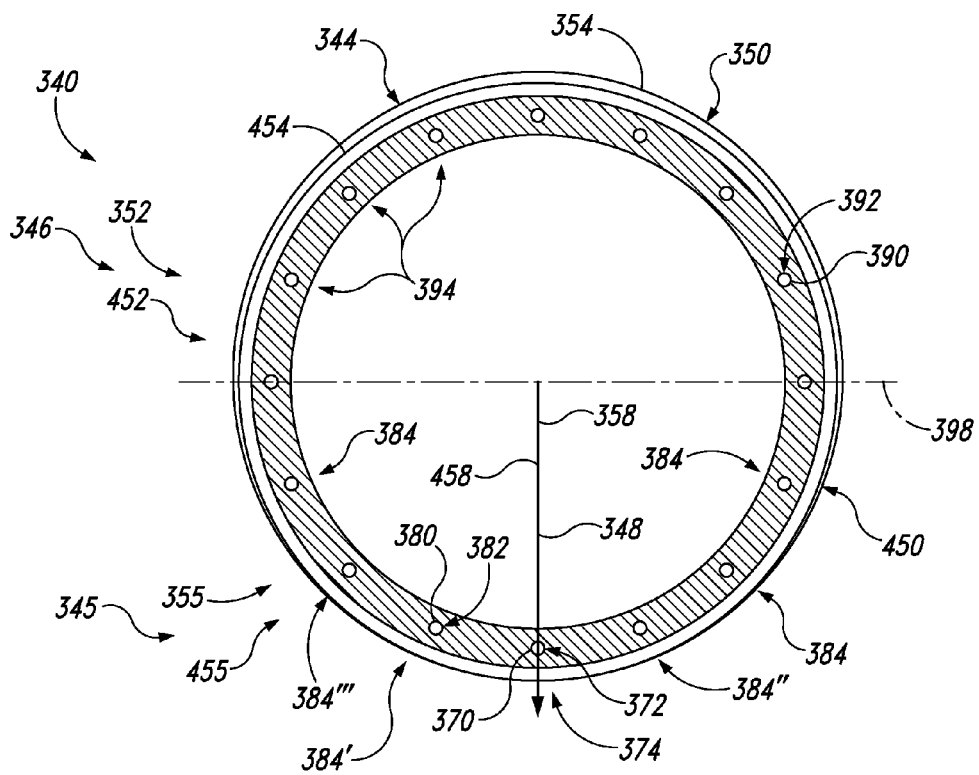
FIG. 17 is a schematic front view illustrating alignment of the layup mandrel and the splice adaptor of FIGS. 15-16.
Figure 18:
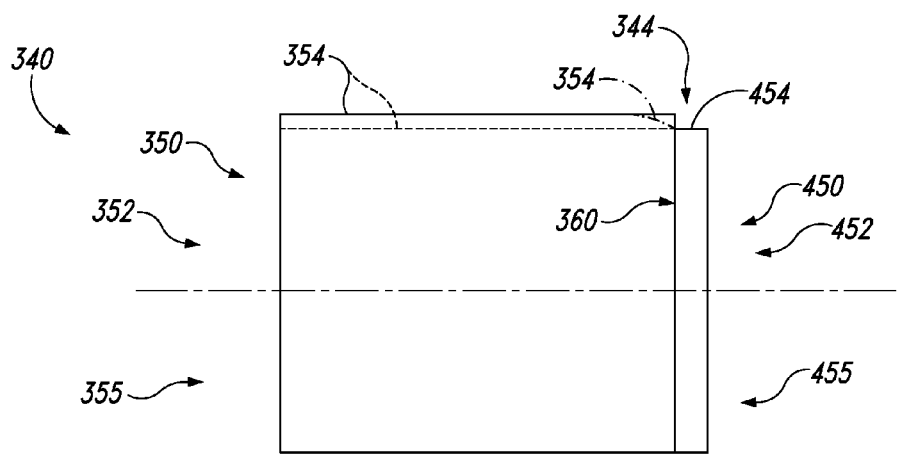
FIG. 18 is a schematic side view illustrating an outer surface of an upper lobe of the layup mandrel of FIGS. 15-17 being conformed to an outer surface of an upper lobe of the splice adaptor.

FIG. 14 is a flowchart depicting methods 300 of assembling a layup tool according to the present disclosure, while FIGS. 15-18 are schematic illustrations of a process flow that may be utilized to form a layup tool 340 and/or that may be performed utilizing method 300 of FIG. 14. More specifically, FIG. 15 is a schematic representation of an inner mold line layup mandrel 350 (which is also referred to herein as a layup mandrel 350) and a splice adaptor 450 that may be combined to form a layup tool 340 according to the present disclosure. FIG. 16 is a schematic side view illustrating alignment of layup mandrel 350 and splice adaptor 450. FIG. 17 is a schematic front view illustrating alignment of layup mandrel 350 and splice adaptor 450. FIG. 18 is a schematic side view illustrating an outer surface 354 of an upper lobe 352 of layup mandrel 350 being conformed to an outer surface 454 of an upper lobe 452 of splice adaptor 450 of FIGS. 15-17.

Returning to FIG. 14, method 300 includes aligning a splice adaptor mating surface with a layup mandrel mating surface at 305 and attaching the splice adaptor to the layup mandrel at an initial attachment point at 310. Methods 300 further include attaching a lower lobe of the splice adaptor to a lower lobe of the layup mandrel at 315 and may include attaching the upper lobe of the splice adaptor to the upper lobe of the layup mandrel at 320 and/or conforming an outer surface of the layup mandrel to an outer surface of the splice adaptor at 325.

Aligning the splice adaptor mating surface with the layup mandrel mating surface at 305 may include aligning in any suitable manner. For example, the aligning at 305 may include aligning such that the splice adaptor mating surface and the layup mandrel mating surface are facing toward one another. As another example, the aligning at 305 may include aligning such that the splice adaptor mating surface and the layup mandrel mating surface are contacting one another. As yet another example, the aligning at 305 may include aligning such that the splice adaptor mating surface and the layup mandrel mating surface are in (direct or indirect) mechanical communication with one another.

This is illustrated in FIGS. 15-16. As illustrated in FIG. 15, the aligning at 305 may include aligning such that a layup mandrel mating surface 356 of layup mandrel 350 is facing toward a splice adaptor mating surface 456 of splice adaptor 450. As illustrated in FIG. 16, the aligning at 305 also may include aligning such that layup mandrel mating surface 356 and splice adaptor mating surface 456 are in contact with one another, are in direct mechanical communication with one another, and/or are in indirect mechanical communication with one another.

As illustrated in FIG. 14 at 306, the aligning at 305 also may include rotationally aligning the splice adaptor and the layup mandrel. The rotationally aligning at 306 may include rotating the splice adaptor and the layup mandrel relative to one another such that a BCL reference direction of the layup mandrel is aligned with, at least substantially aligned with, parallel to, or at least substantially parallel to, a BCL reference direction of the splice adaptor. This may include rotationally aligning both the BCL reference direction of the layup mandrel and the BCL reference direction of the splice adaptor with a BCL reference direction of the layup tool that will be formed therefrom and/or with a BCL reference direction of a fuselage barrel assembly that may be formed utilizing the layup tool. This is illustrated in FIG. 15, where BCL reference direction 358 of layup mandrel 350 is parallel to and/or aligned with BCL reference direction 458 of splice adaptor 450 and both are (at least substantially) parallel to BCL reference direction 348 of layup tool 340.

BCL reference direction 358 of layup mandrel 350, BCL reference direction 458 of splice adaptor 450, and/or BCL reference direction 348 of layup tool 340 may be selected and/or defined in any suitable manner. For example, BCL reference direction 358 of layup mandrel 350, BCL reference direction 458 of splice adaptor 450 and/or BCL reference direction 348 of layup tool 340 may be selected and/or defined such that a composite skin that is formed by layup tool 340 has a shape that defines, or forms, a desired BCL reference direction 190 for fuselage barrel assembly 730 and/or a desired BCL location 733 (as illustrated in FIG. 9).

As illustrated in FIG. 14 at 307, the aligning at 305 also may include radially aligning the splice adaptor and the layup mandrel. The radially aligning at 307 may include radially aligning an outer surface of the splice adaptor with an outer surface of the layup mandrel along and/or proximate the BCL reference direction of the layup tool. This may include radially aligning such that the outer surface of the splice adaptor is matched to the outer surface of the layup mandrel and/or matched to within a threshold offset. Examples of the threshold offset include threshold offsets of less than 0.5 mm, less than 0.4 mm, less than 0.3 mm, less than 0.2 mm, less than 0.1 mm, less than 0.05 mm, less than 0.01 mm, or (at least substantially) 0 mm.

The radially aligning at 307 may include translating the splice adaptor and the layup mandrel relative to one another such that a portion of the outer surface of the splice adaptor is (at least substantially) aligned and/or collinear with a portion of the outer surface of the layup mandrel. The portion of the outer surface of the layup mandrel may be located along and/or intersected by the BCL reference direction of the layup mandrel. Similarly, the portion of the outer surface of the splice adaptor may be located along and/or intersected by the BCL reference direction of the splice adaptor.

This is illustrated schematically in FIG. 16, where an outer surface 354 of layup mandrel 350 is radially aligned with an outer surface 454 of splice adaptor 450 in BCL reference directions 348, 358, and 458. As also illustrated in FIG. 16 at 344 the systems and methods according to the present disclosure may include permitting a mismatch between outer surface 354 and outer surface 454 at locations that are not located along and/or proximate BCL reference directions 348, 358, and 458 during the radially aligning at 307.

Attaching the splice adaptor to the layup mandrel at the initial attachment point at 310 may include initially attaching the splice adaptor to the layup mandrel at an initial attachment point that is located along, proximal, and/or intersected by the BCL reference direction of the layup tool. The attaching at 310 may be accomplished in any suitable manner. For example, the attaching at 310 may include extending an initial fastener through an initial fastener receptacle of the splice adaptor and into the layup mandrel. Under these conditions, the initial fastener receptacle may be located along, proximal, and/or intersected by the BCL reference direction of the layup tool. This is illustrated in FIG. 17, wherein an initial fastener 370 extends through an initial fastener receptacle 372 to operatively attach splice adaptor 450 to layup mandrel 350 at an initial attachment point 374.

Attaching the lower lobe of the splice adaptor to the lower lobe of the layup mandrel at 315 may include operatively attaching to form, or define, a lower lobe of the layup tool. The attaching at 315 may include operatively attaching in any suitable manner and may be performed subsequent to the attaching at 310. For example, the attaching at 315 may include radially aligning the outer surface of the splice adaptor with the outer surface of the layup mandrel proximal a plurality of lower lobe attachment points, as indicated in FIG. 14 at 316. Subsequently, the attaching at 315 further may include attaching the splice adaptor to the layup mandrel at each of the plurality of lower lobe attachment points to retain the radial alignment between the outer surface of the layup mandrel and the outer surface of the splice adaptor within the lower lobe of the layup tool, as indicated in FIG. 14 at 317. This may include extending a plurality of lower lobe fasteners through a plurality of lower lobe fastener receptacles of the splice adaptor and into the layup mandrel.

The attaching at 315 may include attaching at the plurality of lower lobe attachment points in any suitable sequence. As an example, the attaching at 315 may include attaching the splice adaptor to the layup mandrel at a given lower lobe attachment point on a given side of the initial attachment point and at a corresponding lower lobe attachment point on an opposite side of the initial attachment point prior to attaching at another lower lobe attachment point that is farther from the initial attachment point than the given lower lobe attachment point. Under these conditions, the given lower lobe attachment point and the corresponding lower lobe attachment point may be (at least substantially) equidistant from the initial attachment point.

As another example, the attaching at 315 also may include progressing (at least substantially) symmetrically about the initial attachment point. This may include progressing circumferentially around the splice adaptor from the initial attachment point to attach at the plurality of subsequent attachment points.

The attaching at 315 further may include urging a mismatch between the outer surface of the splice adaptor and the outer surface of the layup mandrel toward an upper lobe of the layup tool. Additionally or alternatively, the attaching at 315 may include conforming the outer surface of the splice adaptor to the outer surface of the layup mandrel within the lower lobe of the layup tool. This may include deforming the splice adaptor, such as to match a surface profile of the lower lobe of the splice adaptor to a surface profile of the lower lobe of the layup mandrel.

The plurality of lower lobe attachment points may include any suitable number of lower lobe attachment points. As examples, the plurality of lower lobe attachment points may include at least 2, at least 4, at least 6, or at least 8 lower lobe attachment points. Additionally or alternatively, the plurality of lower lobe attachment points may include fewer than 20, fewer than 18, fewer than 16, fewer than 14, fewer than 12, or fewer than 10 lower lobe attachment points. As an additional example, the plurality of lower lobe attachment points may include an even number of lower lobe attachment points.

The attaching at 315 is illustrated schematically in FIG. 17. Therein, a lower lobe 345 of layup tool 340, which includes a lower lobe 355 of layup mandrel 350 and a lower lobe 455 of splice adaptor 450, extends below an illustrative dash-dot line 398. Conversely, an upper lobe 346 of layup tool 340, which includes upper lobe 352 of layup mandrel 350 and upper lobe 452 of splice adaptor 450, extends above dash-dot line 398. In practice, lower lobe 345 and upper lobe 346 may include any suitable portion of layup tool 340. For example, lower lobe 345 may include a portion of layup tool 340 that extends and/or is located below a passenger floor grid 781 of a fuselage barrel section that may be formed using layup tool 340 and a BCL location 733 of the fuselage barrel section (as illustrated in FIG. 13). Similarly, upper lobe 346 may include a portion of layup tool 340 that extends and/or is located above the passenger floor grid. Under these conditions, dash-dot line 398 may be located and/or extend within the passenger floor grid.

As illustrated in FIG. 17, the attaching at 315 may include attaching at a plurality of lower lobe attachment points 384, such as by extending a plurality of lower lobe fasteners 380 through a plurality of lower lobe fastener receptacles 382, which may be formed in splice adaptor 450, and into layup mandrel 350. This may include attaching at a given lower lobe attachment point 384' on a given side of initial attachment point 374 and at a corresponding lower lobe attachment point 384" on an opposite side of initial attachment point 374 prior to attaching at another attachment point 384''' that is farther from initial attachment 374 than given attachment point 384'. FIG. 17 further illustrates that the attaching at 315 may include urging a mismatch 344 between layup mandrel 350 and splice adaptor 450 toward upper lobe 346 of layup tool 340.

Attaching the upper lobe of the splice adaptor to the upper lobe of the layup mandrel at 320 may include attaching in any suitable manner to form, or define, the upper lobe of the layup tool and may be performed subsequent to the attaching at 315. The attaching at 320 may include attaching at a plurality of upper lobe attachment points, such as by extending a plurality of upper lobe fasteners through a plurality of upper lobe fastener receptacles of the splice adaptor and into the layup mandrel. However, and in contrast to the attaching at 315, the attaching at 320 may include attaching without radially aligning the outer surface of the splice adaptor to the outer surface of the layup mandrel within the upper lobe of the layup tool.

The attaching at 320 is illustrated schematically in FIG. 17. As discussed, the attaching at 320 may include attaching at a plurality of upper lobe attachment points 394. This may include extending a plurality of upper lobe fasteners 390 through a plurality of upper lobe fastener receptacles 392 that are formed in splice adaptor 450 and into layup mandrel 350. As further illustrated in FIG. 17, the attaching at 320 may include attaching without radially aligning outer surface 354 of layup mandrel 350 with outer surface 454 of splice adaptor 450, thus permitting mismatch 344 therebetween.

Methods 300 further may include conforming the outer surface of the layup mandrel to the outer surface of the splice adaptor within the upper lobe of the layup tool, as illustrated in FIG. 14 at 325. The conforming at 325 may be accomplished in any suitable manner and may be performed subsequent to the attaching at 320. For example, the conforming at 325 may include radially aligning the outer surface of the layup mandrel with the outer surface of the splice adaptor. As another example, the conforming at 325 may include removing a portion of the outer surface of the layup mandrel to conform the outer surface of the layup mandrel to the outer surface of the splice adaptor. The removing may be accomplished in any suitable manner, such as by machining, trimming, milling, and/or grinding the layup mandrel.

The conforming at 325 further may include (at least substantially) matching a circumferential length of an outer surface of the layup mandrel to a circumferential length of an outer surface of the splice adaptor at an interface between the layup mandrel and the splice adaptor. As discussed in more detail herein with reference to FIGS. 19-21, a splice adaptor of a given layup tool that may be utilized to fabricate a given fuselage barrel section may be formed concurrently with a splice adaptor of a corresponding layup tool that may be utilized to fabricate an adjacent fuselage barrel section. This fabrication process may be designed such that the circumferential length of the splice adaptor of the given layup tool is (at least substantially) matched to the circumferential length of the splice adaptor of the corresponding layup tool. Thus, the conforming at 325 may insure that an inner circumferential length of an interior joint surface of the given fuselage barrel section is matched to an inner circumferential length of an interior joint surface of the adjacent fuselage barrel section.

The conforming at 325 is illustrated schematically in FIG. 18. Therein, layup tool 340 includes layup mandrel 350 and splice adaptor 450. As illustrated in solid lines, mismatch 344 initially may exist between outer surface 354 of layup mandrel 350 and outer surface 454 of splice adaptor 450. However, and as illustrated in dashed lines and/or in dash-dot lines, a portion of outer surface 354 of layup mandrel 350 may be removed during the conforming at 325 to match outer surface 354 of layup mandrel 350 to outer surface 454 of splice adaptor 450, at least at an interface 360 between layup mandrel 350 and splice adaptor 450.

The conforming at 325 may include removing any suitable portion of layup mandrel 350. As an illustrative, non-exclusive example, and as illustrated in dash-dot lines in FIG. 18, the conforming at 325 may include creating a chamfered, sloped, or dished edge on outer surface 354 near interface 360, with this edge extending along a portion of the length of layup mandrel 350 and/or with this edge having a target, specified, or determined slope, or grade. Illustrative, non-exclusive examples of the slope of the edge includes slopes of less than 100:1, less than 90:1, less than 80:1, less than 70:1, less than 60:1, less than 50:1, less than 40:1, less than 30:1, or less than 20:1. Additionally or alternatively, the slope also may be at least 5:1, at least 10:1, at least 15:1, at least 20:1, at least 30:1, at least 40:1, or at least 50:1. In the above descriptions, the slope is defined as X:Y, with X indicating the distance that material may be removed along the length of surface 354 and Y denoting the depth into layup mandrel 350 that the material may be removed (i.e., the depth of mismatch 344).

As discussed in more detail herein with reference to FIGS. 2-9, it may be beneficial to form adjacent fuselage barrel assemblies such that first inner circumferential length 156 of first fuselage barrel section 150 is similar to, matched to, at least substantially the same as, and/or within the threshold circumferential length difference of second inner circumferential length 166 of second fuselage barrel section 160. With this in mind, the systems, process flows, and methods of FIGS. 19-21 may be designed to facilitate fabrication of adjacent fuselage barrel assemblies with similar, or matched, inner circumferential lengths.

Figure 19:
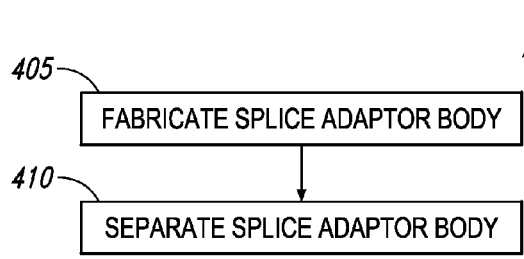
FIG. 19 is a flowchart depicting a method of fabricating a matched pair of splice adaptors according to the present disclosure.
Figure 20:
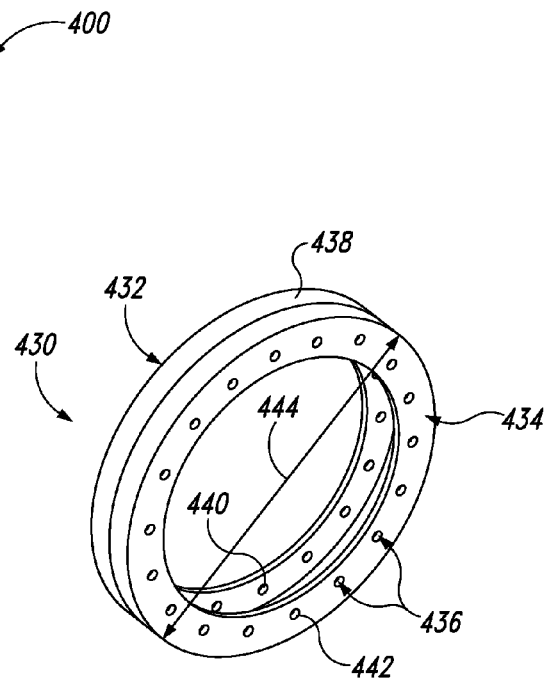
FIG. 20 is a schematic representation of an example of a splice adaptor body according to the present disclosure.
Figure 21:
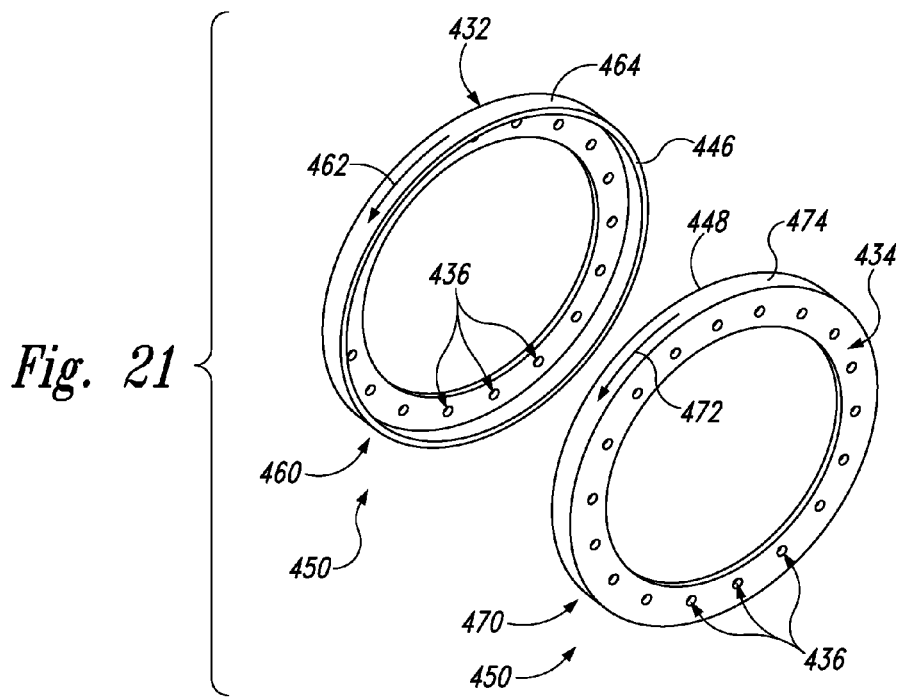
FIG. 21 is a schematic representation of an example of a matched pair of splice adaptors according to the present disclosure.

FIG. 19 is a flowchart depicting a method 400 of fabricating a matched pair of splice adaptors 450 according to the present disclosure, while FIGS. 20-21 are schematic representations of a process flow that may be performed utilizing the method of FIG. 19. More specifically, FIG. 20 is a schematic representation of an example of a splice adaptor body 430 according to the present disclosure. FIG. 21 is a schematic representation of examples of a matched pair of splice adaptors 450 according to the present disclosure. The method of FIG. 19 includes fabricating a splice adaptor body at 405 and separating the splice adaptor body into a matched pair of splice adaptors at 410.

As discussed in more detail herein, the splice adaptors of FIGS. 20-21 may be operatively attached to a respective pair of layup mandrels to form a respective pair of layup tools. Splice adaptors 450 may be constructed and/or attached to the layup mandrels such that the respective pair of layup tools permits improved assembly of adjacent fuselage barrel sections 732 that include respective composite skins 790 (as illustrated in FIGS. 1, 3, 6, and 8) that are formed utilizing the respective pair of layup mandrels.

Fabricating the splice adaptor body at 405 may include fabricating any suitable splice adaptor body that may be utilized to form, or may form, the matched pair of splice adaptors. The splice adaptor body may include a first mating surface and a second mating surface, and the fabricating at 405 may include fabricating, forming, and/or defining the first mating surface and the second mating surface. The first mating surface may be (at least substantially) opposed to the second mating surface. The splice adaptor body may extend between the first mating surface and the second mating surface.

The first mating surface may extend within, or define, a first plane. The second mating surface may extend within, or define, a second plane. The first plane may be (a least substantially) parallel to the second plane. An outer surface of the splice adaptor body may extend between the first mating surface and the second mating surface. The outer surface of the splice adaptor body may be (at least substantially) perpendicular to the first mating surface and to the second mating surface. The outer surface of the splice adaptor body may be shaped to (at least partially define) a surface contour of a fuselage barrel assembly that may be formed utilizing the first splice adaptor and the second splice adaptor.

The splice adaptor body further may include a plurality of fastener receptacles. The plurality of fastener receptacles may extend through the splice adaptor body and/or between the first mating surface and the second mating surface. The plurality of fastener receptacles may extend (at least substantially) perpendicular to the first mating surface and/or to the second mating surface within the splice adaptor body. Each of the plurality of fastener receptacles may include a first opening, which may be formed within the first mating surface, and a second opening, which may be formed within the second mating surface.

The splice adaptor body may have, or define, a maximum characteristic dimension. The maximum characteristic dimension may be at least 4 m, at least 4.5 m, at least 5 m, at least 5.5 m, or at least 6 m. Additionally or alternatively, the maximum characteristic dimension also may be less than 8 m, less than 7.5 m, less than 7 m, less than 6.5 m, or less than 6 m.

The splice adaptor body may be a unitary structure that may be formed from several splice adaptor body segments, with these segments being operatively attached to one another, such as via respective flanges, to form the splice adaptor body. This segmented nature of the splice adaptor body may permit disassembly of a splice adaptor that may be formed therefrom to permit a layup tool that includes the splice adaptor to be separated from a composite skin that may be formed utilizing the layup tool.

The fabricating at 405 may include fabricating, or machining, the splice adaptor body from the unitary structure and/or from the several splice adaptor body segments. The splice adaptor body segments may include, or be formed from, a metal, an alloy, an iron-nickel alloy, Invar, a composite material, and/or bismaleimide.

FIG. 20 provides an example of a splice adaptor body 430 according to the present disclosure. Splice adaptor body 430 includes a first mating surface 432, a second mating surface 434, and an outer surface 438. Splice adaptor body 430 further includes a plurality of fastener receptacles 436. Each fastener receptacle 436 may include a first opening 440, which may be formed within first mating surface 432, and a second opening 442, which may be formed within second mating surface 434. A maximum characteristic dimension 444 of splice adaptor body 430 may be defined, or specified, in a direction that traverses a maximum extent of splice adaptor body 430.

Separating the splice adaptor body into the matched pair of splice adaptors at 410 may include separating to form a first splice adaptor and a second splice adaptor. The first splice adaptor may include the first mating surface and the second splice adaptor may include the second mating surface. Subsequent to the separating at 410, the first splice adaptor may include, or define, a first separated surface and the second splice adaptor may include, or define, a second separated surface. The first separated surface may be opposed to the first mating surface and the second separated surface may be opposed to the second mating surface. The separating at 410 may include forming and/or defining the first separated surface and the second separated surface. Additionally or alternatively, the separating at 410 may include separating within a plane of separation that is (at least substantially) parallel to the first mating surface and to the second mating surface.

The first outer surface of the first splice adaptor may have a first circumferential length at an interface between the first outer surface and the first separated surface. The second outer surface of the second splice adaptor may have a second circumferential length at an interface between the second outer surface and the second separated surface. The first circumferential length may be (at least substantially) equal to the second circumferential length.

The first splice adaptor may be shaped and/or sized to regulate a first inner circumferential length of a first joint portion of a first composite skin of a first fuselage barrel section. Similarly, the second splice adaptor may be shaped and/or sized to regulate a second inner circumferential length of a second joint portion of a second composite skin of a second fuselage barrel section. The first inner circumferential length may correspond to, or even be (at least substantially) equal to, the second inner circumferential length. The first fuselage barrel section and the second fuselage barrel section may be configured to be adjacent to one another, operatively attached to one another, directly operatively attached to one another, and/or abut one another in the fuselage barrel assembly.

FIG. 21 provides examples of a matched pair of splice adaptors 450 that includes a first splice adaptor 460 and a second splice adaptor 470. First splice adaptor 460 includes a first mating surface 432 and second splice adaptor 470 includes a second mating surface 434. In addition, first splice adaptor 460 includes a first separated surface 446 and second splice adaptor 470 includes a second separated surface 448. First splice adaptor 460 also has, or defines, a first circumferential length 462, which also may be referred to herein as a first outer circumferential length 462. Similarly, second splice adaptor 470 has, or defines, a second circumferential length 472, which also may be referred to herein as a second outer circumferential length 472. First circumferential length 462 may be a distance around a first outer surface 464 of first splice adaptor 460. Similarly, second circumferential length 472 may be a distance around a second outer surface 474 of second splice adaptor 470.

In the systems and methods disclosed herein, splice adaptor bodies 430, splice adaptors 450, layup tools 340, fuselage barrel sections 732, frame assemblies 780, and/or fuselage barrel assemblies 730 are illustrated as being (at least substantially) circular, or cylindrical, and/or as having an (at least substantially) circular, or cylindrical, outer surface or transverse cross-sectional shape. However, it is within the scope of the present disclosure that these structures may have, or define, any suitable shape. As examples, splice adaptor bodies 430, splice adaptors 450, layup tools 340, fuselage barrel sections 732, frame assemblies 780, and/or fuselage barrel assemblies 730 may have a circular transverse cross-sectional shape, an elliptical transverse cross-sectional shape, and/or an open-centered figure-eight transverse cross-sectional shape.

As used herein, the phrase, "circumferential length" may refer to any suitable distance around, or along, a corresponding surface and/or structure. More specifically, the circumferential length of a surface and/or structure may refer to a perimeter length of a transverse cross-section of the surface and/or structure. With this in mind, the circumferential length also may be referred to herein as a perimeter length and/or as an edge length.

Examples of inventive subject matter according to the present disclosure are described in the following enumerated paragraphs:

A1. A method of fabricating a matched pair of splice adaptors, the method comprising:
  fabricating a splice adaptor body that includes:
  (i) a first mating surface;
  (ii) a second mating surface that is (at least substantially) opposed to the first mating surface, wherein the splice adaptor body extends between the first mating surface and the second mating surface; and
  (iii) a plurality of fastener receptacles that extend through the splice adaptor body between the first mating surface and the second mating surface; and
  separating the splice adaptor body into the matched pair of splice adaptors, wherein the matched pair of splice adaptors includes a first splice adaptor and a second splice adaptor, wherein the first splice adaptor includes the first mating surface, and further wherein the second splice adaptor includes the second mating surface.

A2. The method of paragraph A1, wherein the first splice adaptor is shaped to regulate a first circumferential length of a first joint portion of a first composite skin of a first fuselage barrel section, and further wherein the second splice adaptor is shaped to regulate a second circumferential length of a second joint portion of a second composite skin of a second fuselage barrel section.

A3. The method of paragraph A2, wherein the first circumferential length corresponds to (or is equal to) the second circumferential length.

A4. The method of any of paragraphs A2-A3, wherein the first fuselage barrel section and the second fuselage barrel section are configured to be adjacent one another in a fuselage barrel assembly.

A5. The method of any of paragraphs A2-A4, wherein the first joint portion and the second joint portion are configured to be (directly) operatively attached to one another in a/the fuselage barrel assembly.

A6. The method of any of paragraphs A2-A5, wherein the first joint portion and the second joint portion are configured to abut one another in a/the fuselage barrel assembly.

A7. The method of any of paragraphs A1-A6, wherein the first mating surface extends within a first plane, wherein the second mating surface extends within a second plane, and further wherein the first plane is (at least substantially) parallel to the second plane.

A8. The method of any of paragraphs A1-A7, wherein an outer surface of the splice adaptor body extends between the first mating surface and the second mating surface.

A9. The method of paragraph A8, wherein the outer surface of the splice adaptor body is (at least substantially) perpendicular to the first mating surface and to the second mating surface.

A10. The method of any of paragraphs A8-A9, wherein the outer surface of the splice adaptor body is shaped to form a surface contour of a/the fuselage barrel assembly.

A11. The method of any of paragraphs A8-A10, wherein a first outer surface of the first splice adaptor and a second outer surface of the second splice adaptor are formed from the outer surface of the splice adaptor body.

A12. The method of any of paragraphs A8-A11, wherein a/the first inner circumferential length of a/the first joint portion of a/the first composite skin of a/the first fuselage barrel section, and a/the second inner circumferential length of a/the second joint portion of a/the second composite skin of a/the second fuselage barrel section both are established based upon a circumferential length of the outer surface of the splice adaptor body.

A13. The method of any of paragraphs A1-A12, wherein the splice adaptor body has a maximum characteristic dimension of at least one of:
  (i) at least 4 meters (m), at least 4.5 m, at least 5 m, at least 5.5 m, or at least 6 m; and
  (ii) less than 8 m, less than 7.5 m, less than 7 m, less than 6.5 m, or less than 6 m.

A14. The method of any of paragraphs A1-A13, wherein the plurality of fastener receptacles extend (at least substantially) perpendicular to the first mating surface and to the second mating surface within the splice adaptor body.

A15. The method of paragraph A14, wherein each of the plurality of fastener receptacles includes a first opening that is formed within the first mating surface and a second opening that is formed within the second mating surface.

A16. The method of any of paragraphs A1-A15, wherein the fabricating the splice adaptor body includes fabricating the splice adaptor body from a unitary body that is formed from a plurality of adaptor body segments that are operatively attached to one another.

A17. The method of paragraph A16, wherein the single piece of material includes at least one of a metal, an alloy, an iron-nickel alloy, Invar, a composite material, and bis-maleimide.

A18. The method of any of paragraphs A1-A17, wherein the splice adaptor body is a unitary body that is formed from a plurality of adaptor body segments that are operatively attached to one another.

A19. The method of any of paragraphs A1-A18, wherein, subsequent to the separating, the first splice adaptor includes a first separated surface, which is opposed to the first mating surface, and the second splice adaptor includes a second separated surface, which is opposed to the second mating surface.

A20. The method of paragraph A19, wherein the separating includes forming the first separated surface and the second separated surface.

A21. The method of any of paragraphs A19-A20, wherein the separating includes separating in a plane of separation that is (at least substantially) parallel to the first mating surface and to the second mating surface.

A22. The method of any of paragraphs A19-A21, wherein a first outer surface of the first splice adaptor has a first circumferential length at an interface between the first outer surface and the first separated surface, wherein a second outer surface of the second splice adaptor has a second circumferential length at an interface between the second outer surface and the second separated surface, and further wherein the first circumferential length is (at least substantially) equal to the second circumferential length.

B1. A method of assembling a layup tool that is utilized to manufacture a fuselage barrel section of an aircraft, the method comprising:

aligning an adaptor mating surface of a splice adaptor with a mandrel mating surface of an inner mold line layup mandrel (or a layup mandrel), wherein the aligning includes:

(i) rotationally aligning a bottom center line (BCL) reference direction of the splice adaptor and a BCL reference direction of the layup mandrel with a BCL reference direction of the layup tool; and (ii) radially aligning an outer surface of the splice adaptor with an outer surface of the layup mandrel along (or proximate) the BCL reference direction of the layup tool;

initially attaching the splice adaptor to the layup mandrel at an initial attachment point that is located along (or proximal to) the BCL reference direction of the layup tool; and subsequent to the initially attaching, attaching a lower lobe of the splice adaptor to a lower lobe of the layup mandrel to form a lower lobe of the layup tool, wherein the attaching the lower lobe includes:

(i) radially aligning the outer surface of the splice adaptor with the outer surface of the layup mandrel proximal each of a plurality of lower lobe attachment points; and (ii) attaching the splice adaptor to the layup mandrel at each of the plurality of lower lobe attachment points to retain radial alignment between the outer surface of the splice adaptor and the outer surface of the layup mandrel within the lower lobe of the layup tool.

B2. The method of paragraph B1, wherein, subsequent to the attaching the lower lobe of the splice adaptor to the lower lobe of the layup mandrel, the method further includes attaching an upper lobe of the splice adaptor to an upper lobe of the layup mandrel to form an upper lobe of the layup tool.

B3. The method of paragraph B2, wherein the attaching the upper lobe includes attaching without radially aligning the outer surface of the splice adaptor to the outer surface of the layup mandrel within the upper lobe.

B4. The method of any of paragraphs B2-B3, wherein the attaching the upper lobe includes attaching at a plurality of upper lobe attachment points.

B5. The method of any of paragraphs B2-B4, wherein the method further includes conforming the outer surface of the layup mandrel to the outer surface of the splice adaptor within the upper lobe.

B6. The method of paragraph B5, wherein the conforming the outer surface of the layup mandrel is subsequent to the attaching the upper lobe.

B7. The method of any of paragraphs B5-B6, wherein the conforming the outer surface of the layup mandrel includes radially aligning the outer surface of the layup mandrel with the outer surface of the splice adaptor.

B8. The method of any of paragraphs B5-B7, wherein the conforming the outer surface of the layup mandrel includes removing a portion of the outer surface of the layup mandrel to conform the outer surface of the layup mandrel to the outer surface of the splice adaptor.

B9. The method of paragraph B8, wherein the removing includes at least one of machining, trimming, and grinding.

B10. The method of any of paragraphs B5-B9, wherein the conforming the outer surface of the layup mandrel includes (at least substantially) matching a circumferential length of the layup mandrel to a circumferential length of the splice adaptor at an interface therebetween.

B11. The method of any of paragraphs B2-B10, wherein the attaching the upper lobe includes extending a plurality of upper lobe fasteners through a plurality of upper lobe fastener receptacles of the splice adaptor and into the layup mandrel.

B12. The method of any of paragraphs B2-B11, wherein the upper lobe of the layup tool includes a portion (and optionally all) of the layup tool that is located between a passenger floor grid plane of the fuselage barrel section and a top center line (TCL) of the layup tool.

B13. The method of any of paragraphs B1-B12, wherein the initially attaching includes extending an initial fastener through an initial fastener receptacle of the splice adaptor and into the layup mandrel.

B14. The method of paragraph B13, wherein the initial fastener receptacle is located along (or proximal) the BCL reference direction of the layup tool.

B15. The method of any of paragraphs B1-B14, wherein the attaching the lower lobe of the splice adaptor to the lower lobe of the layup mandrel includes extending a plurality of lower lobe fasteners through a plurality of lower lobe fastener receptacles of the splice adaptor and into the layup mandrel.

B16. The method of any of paragraphs B1-B15, wherein the rotationally aligning includes aligning such that at least one of:

(i) the BCL reference direction of the splice adaptor is (at least substantially) parallel with the BCL reference direction of the layup mandrel;

(ii) the BCL reference direction of the splice adaptor is (at least substantially) parallel with the BCL reference direction of the layup tool; and (iii) the BCL reference direction of the layup mandrel is (at least substantially) parallel with the BCL reference direction of the layup tool.

B17. The method of any of paragraphs B1-B16, wherein the radially aligning includes radially aligning such that the outer surface of the splice adaptor is matched to the outer surface of the layup mandrel to within a threshold offset.

B18. The method of paragraph B17, wherein the threshold offset is less than 0.5 millimeters (mm), less than 0.4 mm, less than 0.3 mm, less than 0.2 mm, less than 0.1 mm, less than 0.05 mm, less than 0.01 mm, or (at least substantially) 0 mm.

B19. The method of any of paragraphs B1-B18, wherein the radially aligning includes translating the splice adaptor and the layup mandrel relative to one another such that a portion of the outer surface of the splice adaptor is (at least substantially) collinear with a portion of the outer surface of the layup mandrel.

B20. The method of any of paragraphs B1-B19, wherein the plurality of lower lobe attachment points includes at least one of:

(i) at least 2, at least 4, at least 6, or at least 8 lower lobe attachment points;

(ii) fewer than 20, fewer than 18, fewer than 16, fewer than 14, fewer than 12, or fewer than 10 lower lobe attachment points; and (iii) an even number of lower lobe attachment points.

B21. The method of any of paragraphs B1-B20, wherein the attaching the lower lobe includes attaching the splice adaptor to the layup mandrel at a given lower lobe attachment point on a given side of the initial attachment point and at a corresponding lower lobe attachment point on an opposite side of the initial attachment point prior to attaching at another lower lobe attachment point that is farther from the initial attachment point than the given lower lobe attachment point.

B22. The method of paragraph B21, wherein the corresponding lower lobe attachment point and the given lower lobe attachment point are (at least substantially) equidistant from the initial attachment point.

B23. The method of any of paragraphs B1-B22, wherein the attaching the lower lobe includes progressing (at least substantially) symmetrically about the initial attachment point and circumferentially around the splice adaptor from the initial attachment point.

B24. The method of any of paragraphs B1-B23, wherein the attaching the lower lobe includes urging a mismatch between the outer surface of the splice adaptor and the outer surface of the layup mandrel toward an/the upper lobe of the layup tool.

B25. The method of any of paragraphs B1-B24, wherein the attaching the lower lobe includes conforming the outer surface of the splice adaptor to the outer surface of the layup mandrel.

B26. The method of paragraph B25, wherein the conforming the outer surface of the splice adaptor includes deforming the splice adaptor.

B27. The method of any of paragraphs B25-B26, wherein the conforming the outer surface of the splice adaptor includes deforming the splice adaptor to match a surface profile of the lower lobe of the splice adaptor to a surface profile of the lower lobe of the layup mandrel.

B28. The method of any of paragraphs B1-B27, wherein the lower lobe of the layup tool includes a portion of the layup tool that is located between a/the passenger floor grid of the fuselage barrel section and a BCL of the layup tool.

B29. The method of any of paragraphs B1-B28, wherein the method further includes providing the splice adaptor.

B30. The method of paragraph B29, wherein the providing includes performing the method of any of paragraphs A1-A22.

C1. A method of forming a fuselage barrel section of an aircraft, the method comprising:

forming a composite skin of the fuselage barrel section on a layup tool;

separating the layup tool from the composite skin;

locating a frame assembly within an inner volume that is formed by the composite skin; and operatively attaching the frame assembly to the composite skin to form the fuselage barrel section.

C2. The method of paragraph C1, wherein, prior to the forming, the method further includes assembling the layup tool utilizing the method of any of paragraphs B1-B30.

C3. The method of any of paragraphs C1-C2, wherein the layup tool is the layup tool of paragraph E1.

C4. The method of any of paragraphs C1-C3, wherein the layup tool is formed utilizing the method of any of paragraphs B1-B30.

D1. A method of forming a fuselage barrel assembly of an aircraft, the method comprising:

providing a first fuselage barrel section that includes a first joint portion, wherein the first joint portion has a first interior joint surface that has a first inner circumferential length;

providing a second fuselage barrel section that includes a second joint portion, wherein the second joint portion has a second interior joint surface that has a second inner circumferential length;

providing a splice ring that has a splice ring outer surface that has a splice ring outer circumferential length;

operatively aligning the first fuselage barrel section and the second fuselage barrel section such that the first joint portion faces toward the second joint portion;

locating the splice ring within both the first joint portion and the second joint portion while translating the first fuselage barrel section and the second fuselage barrel section toward one another; and operatively attaching the first fuselage barrel section and the second fuselage barrel section to the splice ring.

D2. The method of paragraph D1, wherein no shim extends between the first fuselage barrel section and the splice ring, and further wherein no shim extends between the second fuselage barrel section and the splice ring.

D3. The method of any of paragraphs D1-D2, wherein the first inner circumferential length and the second inner circumferential length, and optionally the splice ring outer circumferential length, differ by less than a threshold circumferential length difference.

D4. The method of any of paragraphs D1-D3, wherein the threshold circumferential length difference is less than 4 millimeters (mm), less than 3.5 mm, less than 3 mm, less than 2.5 mm, less than 2 mm, less than 1.5 mm, less than 1 mm, less than 0.5 mm, less than 0.25 mm, or less than 0.1 mm.

D5. The method of any of paragraphs D1-D4, wherein the first inner circumferential length, the second inner circumferential length, and the splice ring outer circumferential length all are within a threshold circumferential length range.

D6. The method of paragraph D5, wherein the threshold circumferential length range is at least one of:

(i) at least 15 meters (m), at least 15.5 m, at least 16 m, at least 16.5 m, at least 17 m, at least 17.5 m, or at least 18 m; and (ii) less than 21 m, less than 20.5 m, less than 20 m, less than 19.5 m, less than 19 m, less than 18.5 m, or less than 18 m.

D7. The method of any of paragraphs D1-D6, wherein the providing the first fuselage barrel section includes performing the method of any of paragraphs C1-C4.

D8. The method of any of paragraphs D1-D7, wherein the providing the second fuselage barrel section includes performing the method of any of paragraphs C1-C4.

D9. The method of any of paragraphs D1-D8, wherein the operatively attaching includes:

(i) initially operatively attaching at a pair of initial attachment points that are located along (or proximal) a bottom center line (BCL) reference direction of the fuselage barrel assembly; and (ii) subsequently operatively attaching at a plurality of pairs of subsequent attachment points by operatively attaching at a given pair of subsequent attachment points on a given side of the pair of initial attachment points and at a corresponding pair of subsequent attachment points on an opposite side of the pair of initial attachment points prior to attaching at another pair of subsequent attachment points that is farther from the pair of initial attachment points than the given pair of subsequent attachment points.

D10. The method of any of paragraphs D1-D9, wherein the operatively attaching includes operatively attaching at a pair of initial attachment points and progressing (at least substantially) symmetrically about the pair of initial attachment points and circumferentially around the fuselage barrel assembly from the pair of initial attachment points.

E1. A layup tool for forming a composite skin of a fuselage barrel section of an aircraft, the layup tool comprising:

a splice adaptor that has an adaptor mating surface; and
a layup mandrel that has a mandrel mating surface; wherein:

(i) the adaptor mating surface is facing (or is configured to face) the mandrel mating surface;

(ii) the splice adaptor is operatively attached to (or is configured to be operatively attached to) the layup mandrel;

(iii) the splice adaptor is deformed (or is configured to deform) such that a lower outer surface of the splice adaptor that is present within a lower lobe of the splice adaptor is (or may be) radially aligned with a lower outer surface of the layup mandrel that is present within a lower lobe of the layup mandrel; and (iv) an upper outer surface of the layup mandrel that is present within an upper lobe of the layup mandrel is shaped (or configured) to conform to an upper outer surface of the splice adaptor that is present within an upper lobe of the splice adaptor.

F1. The use of the layup tool of paragraph E1 to fabricate a fuselage barrel assembly.

F2. The use of any of the methods of any of paragraphs A1-D10 to fabricate a fuselage barrel assembly.

F3. The use of any of the methods of any of paragraphs A1-D10 with the layup tool of paragraph E1.

F4. The use of the layup tool of paragraph E1 with any of the methods of any of paragraphs A1-D10.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of embodiments of the present disclosure.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A method of assembling a layup tool that is utilized to manufacture a fuselage barrel section of an aircraft, the method comprising:

aligning an adaptor mating surface of a splice adaptor with a mandrel mating surface of a layup mandrel, wherein the aligning includes:
 (i) rotationally aligning a bottom center line (BCL) reference direction of the splice adaptor and a BCL reference direction of the layup mandrel with a BCL reference direction of the layup tool; and
 (ii) radially aligning an outer surface of the splice adaptor with an outer surface of the layup mandrel proximate the BCL reference direction of the layup tool;

initially attaching the splice adaptor to the layup mandrel at an initial attachment point that is located proximate the BCL reference direction of the layup tool;

subsequent to the initially attaching, attaching a lower lobe of the splice adaptor to a lower lobe of the layup mandrel to form a lower lobe of the layup tool, wherein the attaching the lower lobe of the splice adaptor to the lower lobe of the layup mandrel includes:
 (i) radially aligning the outer surface of the splice adaptor with the outer surface of the layup mandrel proximal each of a plurality of lower lobe attachment points; and
 (ii) attaching the splice adaptor to the layup mandrel at each of the plurality of lower lobe attachment points to retain radial alignment between the outer surface of the splice adaptor and the outer surface of the layup mandrel within the lower lobe of the layup tool.

2. The method of claim 1, wherein the initially attaching includes extending an initial fastener through an initial fastener receptacle of the splice adaptor and into the layup mandrel.

3. The method of claim 2, wherein the initial fastener receptacle is located proximate the BCL reference direction of the layup tool.

4. The method of claim 1, wherein the rotationally aligning includes aligning such that at least one of:
(i) the BCL reference direction of the splice adaptor is parallel with the BCL reference direction of the layup mandrel;
(ii) the BCL reference direction of the splice adaptor is parallel with the BCL reference direction of the layup tool; and
(iii) the BCL reference direction of the layup mandrel is parallel with the BCL reference direction of the layup tool.

5. The method of claim 1, wherein the attaching the lower lobe of the splice adaptor to the lower lobe of the layup mandrel includes extending a plurality of lower lobe fasteners through a plurality of lower lobe fastener receptacles of the splice adaptor and into the layup mandrel.

6. The method of claim 1, wherein the attaching the lower lobe includes attaching the splice adaptor to the layup mandrel at a given lower lobe attachment point on a given side of the initial attachment point and at a corresponding lower lobe attachment point on an opposite side of the initial attachment point prior to attaching at another lower lobe attachment point that is farther from the initial attachment point than the given lower lobe attachment point.

7. The method of claim 6, wherein the corresponding lower lobe attachment point and the given lower lobe attachment point are equidistant from the initial attachment point.

8. The method of claim 1, wherein the attaching the lower lobe includes progressing symmetrically about the initial attachment point and circumferentially around the splice adaptor from the initial attachment point.

9. The method of claim 1, wherein the attaching the lower lobe includes conforming the outer surface of the splice adaptor to the outer surface of the layup mandrel.

10. The method of claim 9, wherein the conforming the outer surface of the splice adaptor includes deforming the splice adaptor.

11. The method of claim 1, wherein, subsequent to the attaching the lower lobe of the splice adaptor to the lower lobe of the layup mandrel, the method further includes attaching an upper lobe of the splice adaptor to an upper lobe of the layup mandrel to form an upper lobe of the layup tool.

12. The method of claim 11, wherein the attaching the upper lobe of the splice adaptor to the upper lobe of the layup mandrel includes attaching without radially aligning the outer surface of the splice adaptor to the outer surface of the layup mandrel within the upper lobe.

13. The method of claim 11, wherein the attaching the upper lobe of the splice adaptor to the upper lobe of the layup mandrel includes attaching at a plurality of upper lobe attachment points.

14. The method of claim 11, wherein the method further includes conforming the outer surface of the layup mandrel to the outer surface of the splice adaptor within the upper lobe of the layup tool.

15. The method of claim 14, wherein the conforming the outer surface of the layup mandrel is subsequent to the attaching the upper lobe.

16. The method of claim 14, wherein the conforming the outer surface of the layup mandrel includes removing a portion of the outer surface of the layup mandrel to conform the outer surface of the layup mandrel to the outer surface of the splice adaptor.

17. The method of claim 11, wherein the attaching the upper lobe includes extending a plurality of upper lobe fasteners through a plurality of upper lobe fastener receptacles of the splice adaptor and into the layup mandrel.

18. The method of claim 1, wherein the method further includes providing the splice adaptor by:
fabricating a splice adaptor body that includes:
(i) a first mating surface;
(ii) a second mating surface that is opposed to the first mating surface, wherein the splice adaptor body extends between the first mating surface and the second mating surface; and
(iii) a plurality of fastener receptacles that extend through the splice adaptor body between the first mating surface and the second mating surface; and
separating the splice adaptor body into a matched pair of splice adaptors, wherein the matched pair of splice adaptors includes the splice adaptor and a second splice adaptor, wherein the splice adaptor includes the first mating surface, and further wherein the second splice adaptor includes the second mating surface.

* * * * *